(12) United States Patent
Tadenuma et al.

(10) Patent No.: US 6,222,647 B1
(45) Date of Patent: Apr. 24, 2001

(54) LAMP UNIT AND IMAGE READING APPARATUS USING THE SAME

(75) Inventors: Hironobu Tadenuma; Toshimitsu Ohara; Kenji Higuchi, all of Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 08/860,684

(22) PCT Filed: Oct. 28, 1996

(86) PCT No.: PCT/JP96/03146

§ 371 Date: Jun. 11, 1997

§ 102(e) Date: Jun. 11, 1997

(87) PCT Pub. No.: WO97/16845

PCT Pub. Date: May 9, 1997

(30) Foreign Application Priority Data

Oct. 30, 1995 (JP) .................................................. 7-281697
Aug. 6, 1996 (JP) .................................................. 8-223081

(51) Int. Cl.[7] .................................................................... H04N 1/04
(52) U.S. Cl. ............................................................................ 358/475
(58) Field of Search ...................................... 313/634, 313, 313/315, 318; 358/401, 475, 480

(56) References Cited

U.S. PATENT DOCUMENTS

| 3,668,456 | * | 6/1972 | Anderson ............................. 313/315 |
| 3,899,714 |   | 8/1975 | Esterson et al. . |
| 5,258,857 | * | 11/1993 | Ichinose ............................... 358/474 |
| 5,710,485 | * | 1/1998 | Schmitt, Jr. ........................... 313/634 |

FOREIGN PATENT DOCUMENTS

| 0 588 200 | 3/1994 | (EP) | ................................ H01J/61/50 |
| 62-195847 | 8/1987 | (JP) | ................................ H01J/61/52 |
| 64-21960 | 2/1989 | (JP) | ................................ H01J/61/52 |
| 6-118517 | 4/1994 | (JP) | ................................ G03B/27/52 |
| 7-123213 | 5/1995 | (JP) | ................................ H04N/1/04 |
| 7-123214 | 5/1995 | (JP) | ................................ H04N/1/04 |

OTHER PUBLICATIONS

Patent abstract of Japan, vol. 010, No. 137, (ER–405) May 21, 1986 & JP 61 002254 A (Toshiba KK) Jan. 8, 1986, *Abstract.

Patent Abstract of Japan, vol. 013, No. 213 (E–759), May 18, 1989 & JP 01 027157 A (Toshiba Corp; Others:01) Jan. 30, 1989 *Abstract.

Database WPI Section EI, Week 8203 Derwent Publications Ltd., London, GB; Class X26, AN 82–A5941E XP002068823 & SU 817 802 B (Sulatskov V G) *Abstract.

Patent Abstract of Japan vol. 005, No. 040 (E–049), Mar. 17, 1981 & JP 55 165564 A (Toshiba Corp), Dec. 24, 1980 *Abstract.

Corresponding International Search Report.

* cited by examiner

*Primary Examiner*—Jerome Grant, II
(74) *Attorney, Agent, or Firm*—Sughrue, Mion, Zinn, Macpeak & Seas, PLLC

(57) ABSTRACT

Concerning a lamp unit which is used as a light source of an image reading apparatus, there is provided a lamp unit which reduces a change over time in the quantity of light. The lamp unit is provided with a hollow cylindrical gas-filled tube in which a gas is filled; a pair of electrodes which are secured to an outer peripheral surface of the gas-filled tube and extend in the longitudinal direction of the gas-filled tube in a mutually opposing state; an electrically insulating cladding tube surrounding the electrodes and the gas-filled tube; and a heat-accumulating member provided in contact with an outer peripheral surface of the cladding tube and extending in the longitudinal direction of the cladding tube.

20 Claims, 13 Drawing Sheets

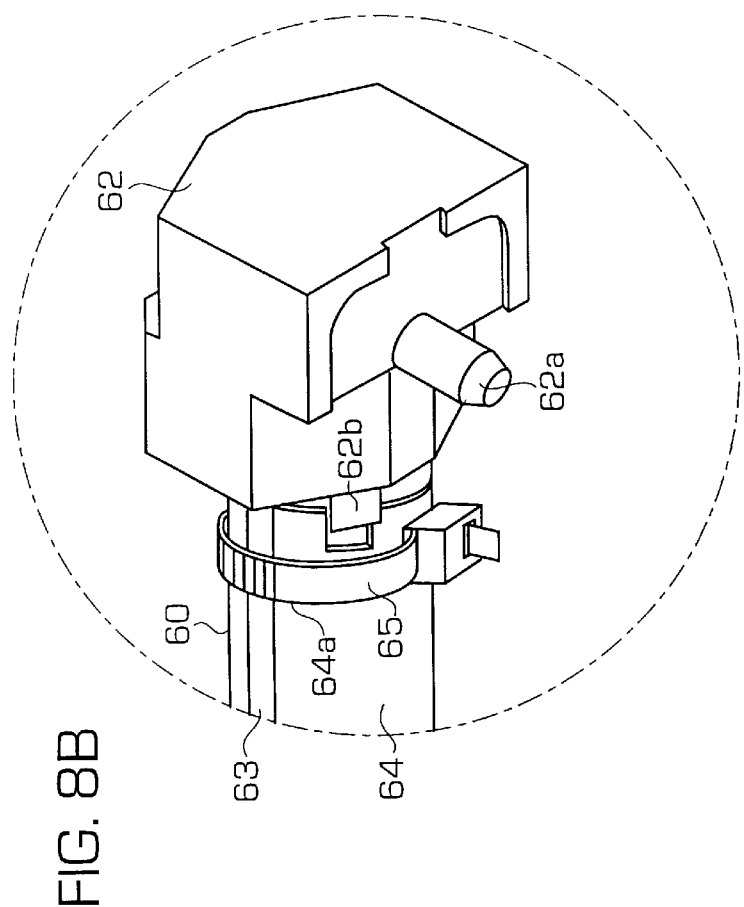
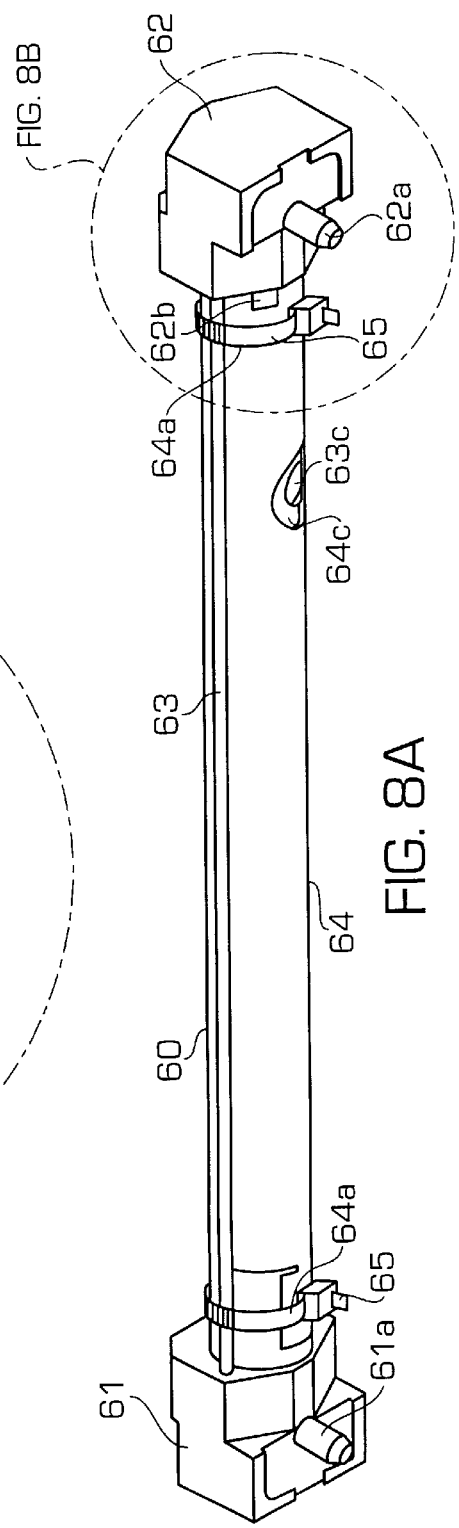

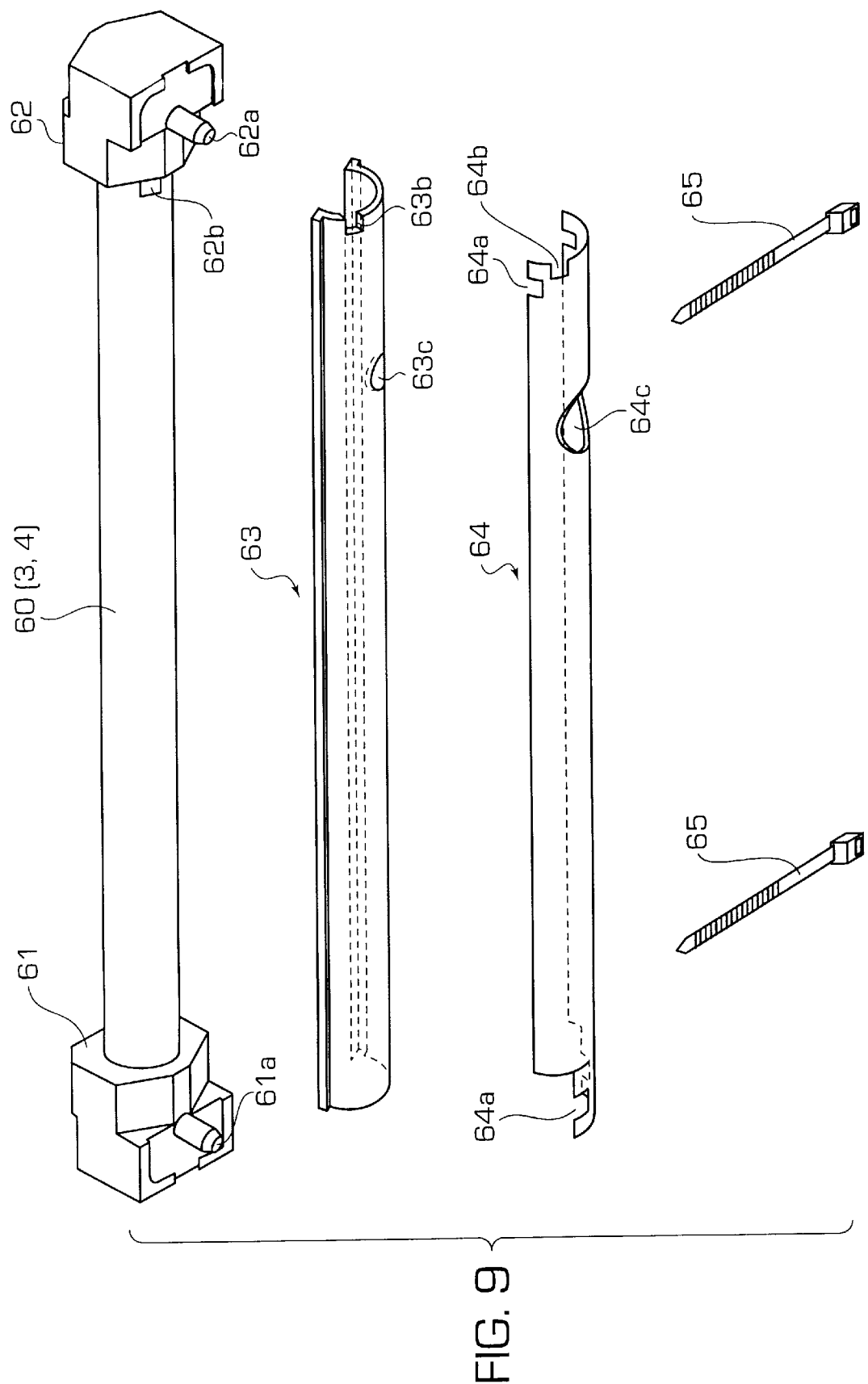

LAMP UNIT AND IMAGE READING APPARATUS USING THE SAME

TECHNICAL FIELD

The present invention relates to a lamp unit suitable for use in an image reading apparatus which is called an image scanner or the like, as well as an image reading apparatus using the lamp unit.

BACKGROUND ART

In general, in an image reading apparatus, a cylindrically shaped lamp is disposed in a widthwise direction of an original, and light produced from the lamp is applied to the original. Then, the light reflected by the original or the light transmitted through the original is read by an image sensor, such as a CCD image sensor.

As lamps which are used for image reading apparatuses and various other apparatuses, those of various configurations are conventionally known.

For example, a hot-cathode tube of a so-called both-end electrode type is known in which, as shown in FIG. 16, a pair of electrodes 52a and 52b serving as hot cathodes are disposed at both ends of a gas-filled tube 51 in which a gas is filled. Reference numeral 53 denotes a fluorescent material applied to an inner peripheral surface of the gas-filled tube 51. As is well known, the hot cathode refers to an electrode which generates heat upon being energized, and emits thermions.

In addition, a cold-cathode tube of a so-called both-end electrode type is also known in which, as shown in FIG. 17, a pair of electrodes 54a and 54b serving as cold cathodes are disposed at both ends of a gas-filled tube 51. As is well known, the cold cathode refers to an electrode which emits electrons when a strong electric field is applied thereto.

Further, a cathode tube of a so-called outer-surface electrode type is also known in which, as shown in FIG. 18, a pair of elongated electrodes 55a and 55b are disposed substantially over entire longitudinal regions of the outer peripheral surface of a gas-filled tube 51 in such a manner as to face each other. Under the circumstances, the electrodes 55a and 55b are generally configured as cold cathodes, but in a case where the electrodes 55a and 55b can be configured as hot cathodes, such an arrangement may be adopted.

In the various types of lamps described above, a rare gas, such as neon (Ne) gas or xenon (Xe) gas, or mercury (Hg) gas is filled in the gas-filled tube 51, depending on applications. If an examination is made of the manner of change in the quantity of emission of light at a time when the ambient temperature is changed with respect to, for example, a lamp using the mercury gas and a lamp using the xenon gas, results such as those shown in FIG. 11 are obtained. As is apparent from the results, the lamp using the xenon gas excels over the lamp using the mercury gas in terms of the stability in the quantity of light with respect to the change in the ambient temperature. Accordingly, the xenon gas is used widely for the lamps of image reading apparatuses. In addition, since the neon gas also excels in the stability of the quantity of light, the neon gas is also used widely for the lamps of image reading apparatuses.

If the change over time of the quantity of light emitted from the lamp is observed, results such as those shown in FIG. 12 are obtained. In the graph shown in the drawing, the rate of change in the quantity of light is taken as the X-axis, the time is taken as the Y-axis, and the axial direction, i.e., the horizontal scanning direction, of a lamp 56 is taken as the Z-axis. It is now assumed that the quantity of light immediately after the lamp 56 is lit up is uniformly 100% in its axial direction, i.e., in its longitudinal direction, as shown by reference character A. After the lapse of an appropriate time t subsequent to lighting, the overall quantity of light from the lamp 56 declines as shown by reference character B1, and the quantity of light declines more in a central portion in the longitudinal direction than in opposite end portions. In this description, a change δ1 in the quantity of light in the X-direction when 100% of the quantity of light immediately after lighting-up is set as a reference will be referred to as a rate of change in the quantity of light. In addition, when one line of distribution of the quantity of light is viewed at an arbitrary point of time, the difference δ2 between a maximum rate of change in the quantity of light (normally in a central portion) and a minimum rate of change in the quantity of light (normally in opposite end portions) in that line of distribution of the quantity of light will be referred to as a difference in the rate of change in the quantity of light.

For example, if a comparison is made among the three types of lamps shown in FIGS. 16 through 18, i.e., the cathode tube of the outer-surface electrode type (FIG. 18), the hot-cathode tube of the both-end electrode type (FIG. 16), and the cold-cathode tube of the both-end electrode type (FIG. 17), the quantity of emission of light is the largest in the case of the cathode tube of the outer-surface electrode type (FIG. 18), the next largest is the hot-cathode tube of the both-end electrode type (FIG. 16), and the smallest is the cold-cathode tube of the both-end electrode type (FIG. 17). That is, with respect to the quantity of emission of light, it can be said that The cathode tube of the outer-surface electrode type (FIG. 18) >the hot-cathode tube of the both-end electrode type (FIG. 16) >the cold-cathode tube of the both-end electrode type (FIG. 17) Specifically, the cathode tube of the outer-surface electrode type (FIG. 18) has a quantity of emission of light which is about three times greater than that of the cold-cathode tube of the both-end electrode type (FIG. 17).

On the other hand, both the rate of change δ1 in the quantity of light and the difference δ2 in the rate of change in the quantity of light are relatively small in the case of the hot-cathode tube of the both-end electrode type (FIG. 16) and the cold-cathode tube of the both-end electrode type (FIG. 17). In contrast, both the rate of change δ1 in the quantity of light and the difference δ2 in the rate of change in the quantity of light are considerably large in the case of the cathode tube of the outer-surface electrode type (FIG. 18).

Since the rate of change δ1 in the quantity of light and the difference δ2 in the rate of change in the quantity of light are small in the case of the hot-cathode tube of the both-end electrode type (FIG. 16) and the cold-cathode tube of the both-end electrode type (FIG. 17) as described above, in a case where these cathode tubes are used for ordinary image reading apparatuses, no problems are encountered in practical use from the standpoint of the change in the quantity of light. However, since the quantity of emission of light per se is small in the case of these lamps, there are cases where it is impossible to obtain clear read images. In addition, even if the variations in the quantity of light are small, and no problems are encountered in practical use, it can be said with respect to ordinary image reading apparatuses, and if such cathode tubes are used as lamps for high-quality image input apparatuses as in the case of reading films in applications for publication, the reproducibility of reading results still declines due to variations in the quantity of light.

The cathode tube of the outer-surface electrode type (FIG. 18) has a large quantity of emission of light, and is therefore suitable for reading clear images. However, since this lamp has a considerably large rate of change δ1 in the quantity of light and a considerably large difference δ2 in the rate of change in the quantity of light, if this lamp is used as the lamp for the image reading apparatus, the characteristics of read images deteriorate due to the change over time in the quantity of light. Specifically, there arises the problem that the quantity of light changes substantially between the start of reading of the original and the end of reading, the reproduced image becomes gradually dark, and a central portion, in particular, becomes dark.

Accordingly, as a countermeasure for overcoming such a problem, there has been a demand to lower the rate of change δ1 in the quantity of light and the difference δ2 in the rate of change in the quantity of light in the lamp.

Meanwhile, Japanese Patent Application Laid-Open No. 123214/1995 discloses an image input apparatus in which, as shown in FIGS. 19 and 20, heat is insulated by maintaining heat which is generated by a fluorescent lamp 92 itself during the emission of light by attaching a heat insulating material 93 to the fluorescent lamp 92 in close contact therewith so as to improve the lighting-up rise characteristic, and the fluorescent lamp 92 is controlled to an appropriate quantity of light by detecting the illuminance by a photosensor 98. Incidentally, reference numeral 91 denotes an original-reading background plate; 94, a mirror; 95, a slit; 96, a lens; 97, a CCD image sensor; and 99, an original which is fed in the direction of arrow. The conventional technique disclosed in this publication is aimed at improving the lighting-up rise characteristic of the lamp, and gives no disclosure as to the reduction of both the rate of change δ1 in the quantity of light and the difference δ2 in the rate of change in the quantity of light to satisfactory levels.

DISCLOSURE OF THE INVENTION

To overcome the above-described problem, as a result of conducting research into the causes of the occurrence of the aforementioned rate of change δ1 in the quantity of light and difference δ2 in the rate of change in the quantity of light in the lamp, the inventor of the present application found that there is a close relationship between the amount of change in the temperature of the tube wall of the lamp in a predetermined time duration and the rate of change in the quantity of light from the lamp in that time duration, and that the rate of change in the quantity of light becomes large with an increase in the-tube wall temperature.

The present invention has been devised in view of the above-described knowledge, and its viewpoint consists in reducing both the rate of change δ1 in the quantity of light and the difference δ2 in the rate of change in the quantity of light to satisfactory levels concerning lamps of various types. In addition, another viewpoint of the present invention lies in the provision of an image reading apparatus using this lamp. In addition, still another viewpoint of the present invention lies in suitably controlling the lamp used for the image reading apparatus.

It should be noted that the heat-accumulating means referred to in the description that follows means a material having a property whereby the lamp can be deprived of its heat, and that heat can be accumulated inside itself. In other words, the heat-accumulating means refers to a material which is capable of reducing the rate of increase in the temperature of the lamp immediately after lighting-up, and of prolonging the time required for cooling the lamp by the radiation of heat, and the heat-accumulating means is preferably a material having a large heat capacity. In addition, the phrase "the heat-accumulating means (or the heat-accumulating member) is provided around the lamp" is meant to include cases where the heat-accumulating means is directly secured to an outer peripheral surface or an inner peripheral surface of the lamp, or cases where the heat-accumulating means is disposed in proximity to the lamp in a state in which some member or-other is interposed therebetween.

To attain these viewpoints, the lamp unit in accordance with the present invention comprises: a lamp including a hollow cylindrical gas-filled tube in which a gas is filled and a pair of electrodes provided at opposite end portions of the gas-filled tube; and heat-accumulating means provided around the lamp, wherein the heat-accumulating means has silicone rubber provided around the lamp and a metallic member provided in contact with an outer peripheral surface of the silicone rubber. In accordance with this lamp unit, since the heat-accumulating means is provided around the lamp including the hollow cylindrical gas-filled tube in which a gas is filled and the pair of electrodes provided at the opposite end portions of the gas-filled tube (the lamp of the both-end electrode type such as those shown in FIGS. 16 and 17), the tube wall of the lamp is deprived of its heat by this heat-accumulating means, and that heat is accumulated inside the heat-accumulating means. Accordingly, the rate of increase in the temperature of the lamp after lighting-up is reduced, with the result that both the rate of change δ1 in the quantity of light and the difference δ2 in the rate of change in the quantity of light are made small. As described above, if the temperature of the tube wall of the lamp increases, the rate of change in the quantity of light becomes large. To put it differently, if the temperature of the tube wall of the lamp can be controlled, the rate of change in the quantity of light can be also controlled. Then, in accordance with this lamp unit, since the heat-accumulating means has silicone rubber provided around the lamp and a metallic member provided in contact with the outer peripheral surface of the silicone rubber, the following operation and effects can be obtained. Namely, since the silicone rubber excels in its thermal conductivity and characteristic of close contact (a property in which its surface is active and bites into various materials), whereas the metallic member excels in a heat-accumulating characteristic. Hence, the heat of the lamp is transmitted satisfactorily to the metallic member through the silicone rubber, and is accumulated in the metallic member. Moreover, since the silicone rubber itself also has a heat-accumulating characteristic, the heat of the lamp is also accumulated in the silicone rubber. Therefore, it is possible to effectively reduce the rate of increase in the temperature of the lamp after lighting-up, and to favorably reduce the rate of change δ1 in the quantity of light and the difference δ2 in the rate of change in the quantity of light. Moreover, the metallic member can also function as a protecting member for the lamp.

In addition, the lamp unit in accordance with the present invention comprises: a lamp including a hollow cylindrical gas-filled tube in which a gas is filled and a pair of electrodes provided at opposite end portions of the gas-filled tube; a heat-accumulating sheet made of silicone rubber and serving as a heat-accumulating member provided around the lamp; a heat-accumulating metal plate having a C-shaped cross section and serving as a heat-accumulating member, the heat-accumulating metal plate being provided in contact with an outer peripheral surface of the heat-accumulating sheet, wherein the heat-accumulating sheet and the heat-accumulating metal plate are attached to the lamp by means of fastening belts. Therefore, the lamp unit can be fabricated easily. That is, the lamp unit can be fabricated simply by applying the heat-accumulating sheet and the heat-accumulating metal plate to the lamp and by fastening the fastening belts. Furthermore, since the heat-accumulating metal plate is formed into a C-shaped cross-sectional configuration, the heat-accumulating sheet and the heat-accumulating metal plate can be easily applied to the lamp, and the operation of fastening the fastening belts is also facilitated.

Further, the lamp unit in accordance with the present invention comprises: a lamp including a hollow cylindrical gas-filled tube in which a gas is filled and a pair of electrodes which are provided on an outer peripheral surface of the gas-filled tube and extend in a longitudinal direction of the gas-filled tube in a mutually opposing state; an electrically insulating cladding tube surrounding the lamp; and heat-accumulating means provided in contact with an outer peripheral surface of the cladding tube. In accordance with this lamp unit, the arrangement provided is such that the electrically insulating cladding tube which surrounds the lamp is provided, and the heat-accumulating means is provided in contact with the outer peripheral surface of the cladding tube. Therefore, an appropriate suitable heat-accumulating means can be provided without shortcircuiting the electrodes. Moreover, the space between the lamp and the cladding tube also functions as the heat-accumulating means. Therefore, with respect to the lamp of the outer-surface electrode type which makes it possible to obtain a large quantity of emission of light, it is possible to favorably reduce both the rate of change $\delta 1$ in the quantity of light and the difference $\delta 2$ in the rate of change in the quantity of light.

Further, the lamp unit in accordance with the present invention comprises: a lamp including a hollow cylindrical gas-filled tube in which a gas is filled and a pair of electrodes which are provided on an outer peripheral surface of the gas-filled tube and extend in a longitudinal direction of the gas-filled tube in a mutually opposing state; heat-accumulating means provided in contact with an outer peripheral surface of the lamp at a position where the heat-accumulating means does not contact the pair of electrodes; and an electrically insulating cladding tube surrounding the lamp and the heat-accumulating means. In accordance with this lamp unit, since the heat-accumulating means is provided in contact with the outer peripheral surface of the lamp, an appropriate suitable heat-accumulating means can be provided without shortcircuiting the electrodes. In addition, since the electrically insulating cladding tube surrounding the lamp and the heat-accumulating means is provided, the electrically insulating characteristic is ensured. At the same time, since the space between the lamp and the cladding tube also functions as the heat-accumulating means, with respect to the lamp of the outer-surface electrode type, it is possible to favorably reduce both the rate of change $\delta 1$ in the quantity of light and the difference $\delta 2$ in the rate of change in the quantity of light.

Further, the lamp unit in accordance with the present invention comprises: a lamp including a hollow cylindrical gas-filled tube in which a gas is filled and a pair of electrodes which are provided on an outer peripheral surface of the gas-filled tube and extend in a longitudinal direction of the gas-filled tube in a mutually opposing state; and an electrically insulating heat-accumulating member provided around the lamp. In accordance with this lamp unit, since the electrically insulating heat-accumulating member is provided around the lamp, it is possible to dispose the heat-accumulating means without shortcircuiting the electrodes. Therefore, with respect to the lamp of the outer-surface electrode type, it is possible to favorably reduce both the rate of change $\delta 1$ in the quantity of light and the difference $\delta 2$ in the rate of change in the quantity of light.

Further, the lamp unit in accordance with the present invention comprises: a lamp including a hollow cylindrical gas-filled tube in which a gas is filled and a pair of electrodes which are provided on an outer peripheral surface of the gas-filled tube and extend in a longitudinal direction of the gas-filled tube in a mutually opposing state; an electrically insulating cladding tube surrounding the lamp; a heat-accumulating sheet made of silicone rubber and serving as a heat-accumulating member provided in contact with an outer peripheral surface of the cladding tube; a heat-accumulating metal plate having a C-shaped cross section and serving as a heat-accumulating member, the heat-accumulating metal plate being provided in contact with an outer peripheral surface of the heat-accumulating sheet, wherein the heat-accumulating sheet and the heat-accumulating metal plate are attached to the cladding tube by means of fastening belts. Therefore, the lamp unit can be fabricated easily. That is, the lamp unit can be fabricated simply by applying the heat-accumulating sheet and the heat-accumulating metal plate to the cladding tube and by fastening the fastening belts. Furthermore, since the heat-accumulating metal plate is formed into a C-shaped cross-sectional configuration, the heat-accumulating sheet and the heat-accumulating metal plate can be easily applied to the cladding tube, and the operation of fastening the fastening belts is also facilitated.

In addition to the above, the lamp unit in accordance with the present invention has as its viewpoints of invention those described in the best mode for carrying out the invention and those which are apparent from the drawings.

An image reading apparatus in accordance with the present invention comprises: a light source for emitting light for illuminating an original; and an image sensor for receiving a light image from the original and providing an output as an electrical signal, wherein the light source is constituted by the lamp unit according to any one of claims 1 to 16. In accordance with this image reading unit, the rate of change $\delta 1$ in the quantity of light from the lamp and the difference $\delta 2$ in the rate of change in the quantity of light are reduced, and an excellent image reading apparatus can be obtained.

Further, in the image reading apparatus in accordance with the present invention, in the above-described image reading apparatus, the lamp is turned off after completion of the illumination for reading the original. In accordance with this image reading apparatus, since the arrangement is provided such that the lamp is turned off after completion of the illumination for reading the original, it is possible to avoid the saturation of heat in the heat-accumulating means or the heat-accumulating member by suppressing an increase in the temperature of the lamp. Consequently, it is possible to reliably reduce the rate of change $\delta 1$ in the quantity of light and the difference $\delta 2$ in the rate of change in the quantity of light, and an excellent image reading apparatus can be obtained.

In addition to the above, the image reading apparatus in accordance with the present invention has as its viewpoints of invention those described in the best mode for carrying out the invention and those which are apparent from the drawings.

BRIEF DESCRIPTION OF THE DRAWINGS

FIG. 8 is a diagram which simultaneously show a perspective view illustrating a fourth embodiment of the lamp unit in accordance with the present invention and a partially enlarged view thereof;

FIG. 9 is an exploded perspective view thereof;

BEST MODE FOR CARRYING OUT THE INVENTION

Next, a description will be given of the best mode for carrying out the present invention with reference to the drawings.

Figure 1:
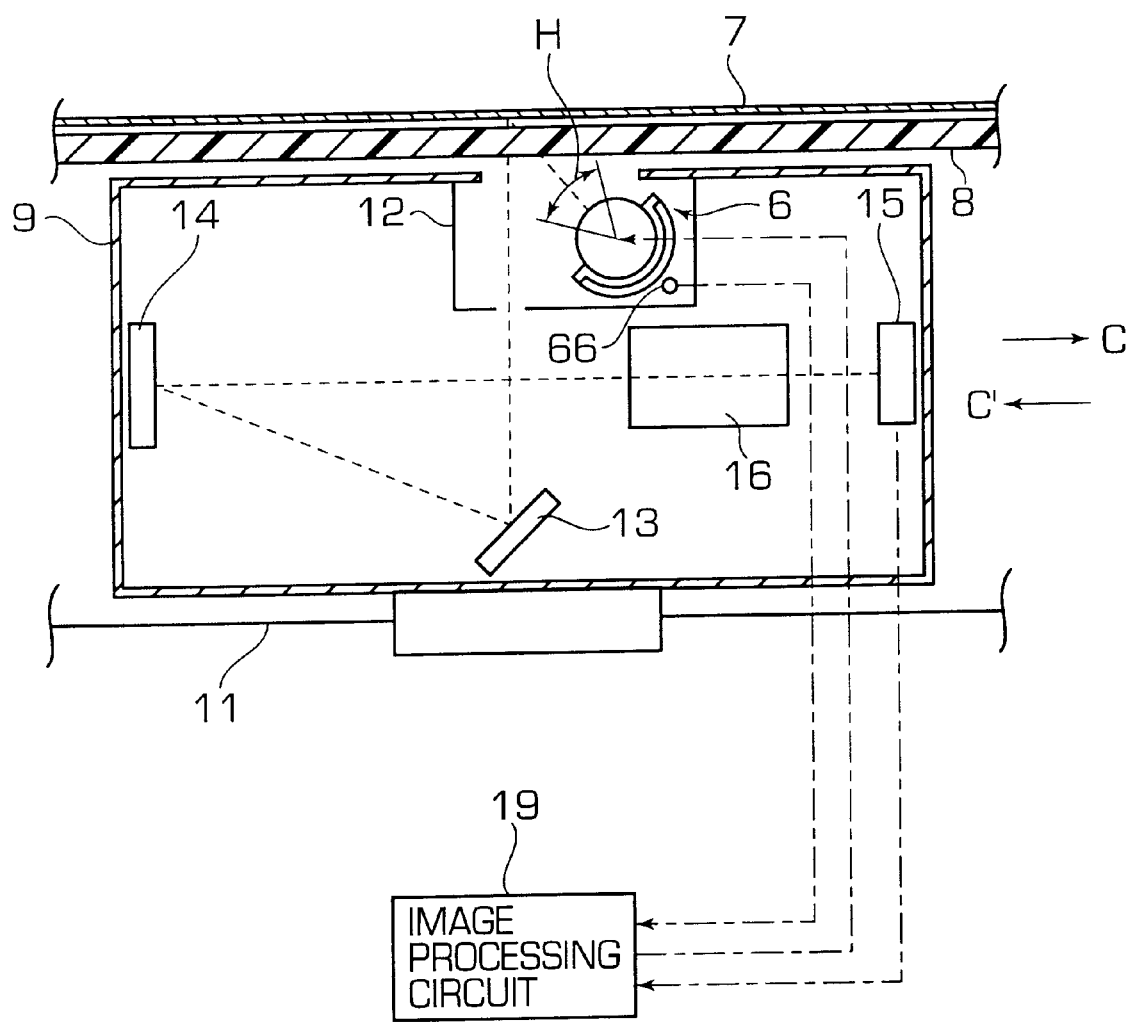
FIG. 1 is a front cross-sectional view illustrating an embodiment of the lamp unit and the image reading apparatus in accordance with the present invention.

FIG. 1 is a diagram illustrating an embodiment of essential portions of an image reading apparatus in a case where a lamp unit in accordance with the present invention is used as a light source of the image reading apparatus. As shown in the drawing, a carriage 9 is disposed at a position below original table glass 8 on which an original 7 is placed. This carriage 9 is driven by a conveying device 11 such as a wire or a belt, and reciprocates in parallel to the original table glass 8, as shown by arrow C and arrow C'. With respect to the original 7, the left-and-right direction in the drawing is the longitudinal direction of the original, and the direction perpendicular to the plane of the drawing is the widthwise direction of the original. When the carriage 9 moves in the direction of arrow C (in the rightward direction in the drawing), the carriage 9 reads the original 7 in its longitudinal direction, i.e., the vertical scanning direction. Provided in the carriage 9 are various optical elements, such as a lamp unit 6 surrounded by a light-shielding plate 12, a first mirror 13, a second mirror 14, a CCD image sensor 15 serving as an image reading sensor, and a lens 16 for focusing the optical image of the original 7 onto the CCD image sensor 15.

Figure 2:
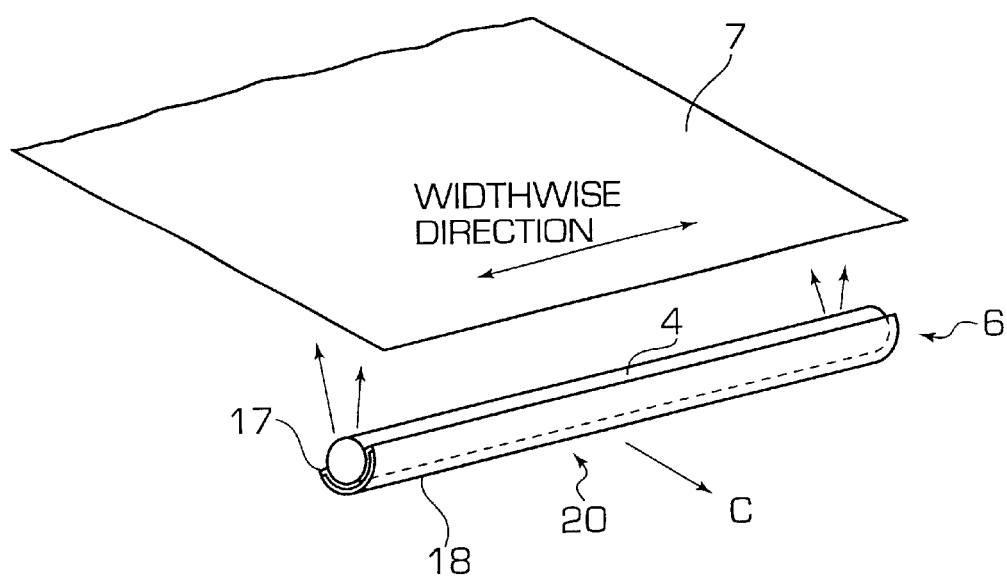
FIG. 2 is a perspective view illustrating an overall lamp unit shown in FIG. 1.

As shown in FIG. 2, the lamp unit 6 extends in the widthwise direction of the original 7, and the width of its effective light-emitting portion is set to be wider than the width of the original 7. As is well known, the CCD image sensor 15 is an image sensor for producing an image signal by fetching outputs of a plurality of photoelectric detectors, such as photodiodes, which are arranged in a straight line as a time-series signal by using a charge coupled device (CCD). In this embodiment, the photoelectric detectors are arranged in the widthwise direction of the original 7, i.e., in a perpendicular direction to the plane of the drawing of FIG. 1.

First Embodiment

Figure 3:
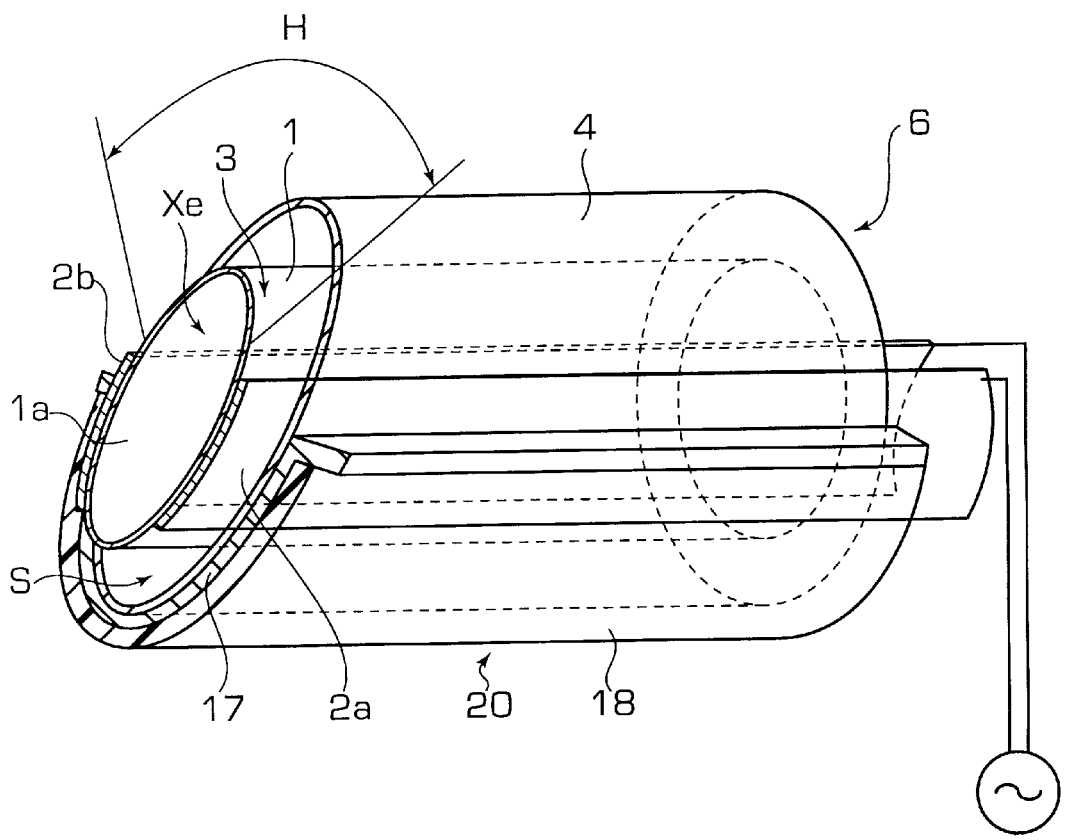
FIG. 3 is a radially fragmentary perspective view illustrating the lamp unit shown in FIG. 1.
Figure 4:
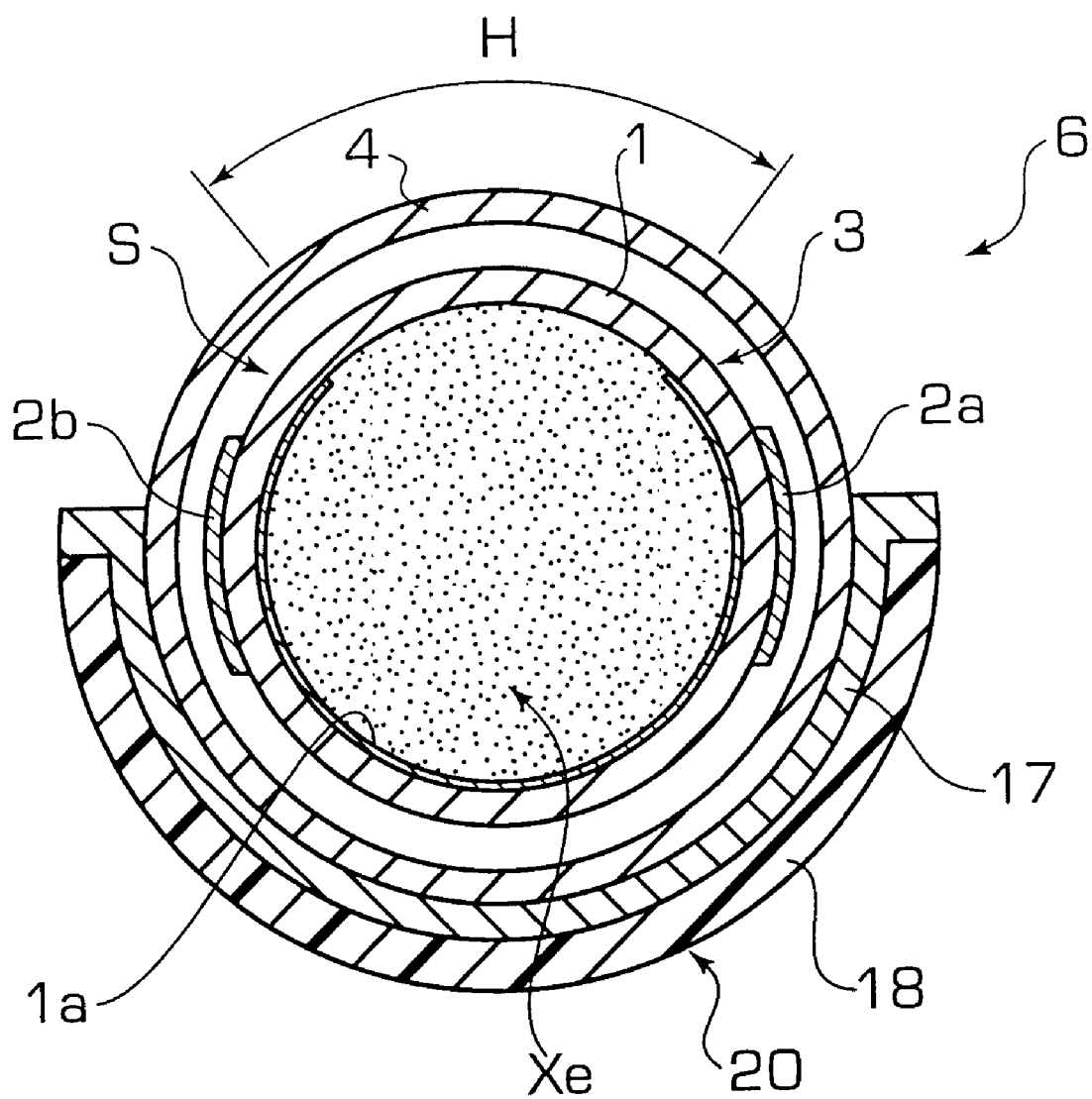
FIG. 4 is a cross-sectional view of the lamp unit shown in FIG. 1.

FIGS. 3 and 4 are diagrams which illustrate a first embodiment of the lamp unit, in which FIG. 3 is a fragmentary perspective view and FIG. 4 is a cross-sectional view. As shown in these drawings, this lamp unit 6 is comprised of a hollow cylindrical gas-filled tube 1 in which, for example, xenon gas Xe is filled; a lamp 3 of an outer-surface electrode type having a pair of electrodes 2a and 2b secured to an outer peripheral surface of the gas-filled tube 1 by bonding or the like; a cladding tube 4 surrounding the lamp 3; and a heat-accumulating means 20 provided in contact with the outer peripheral surface of the cladding tube 4.

The gas-filled tube 1 is formed from, for example, a transparent glass tube, and its internal surface is coated with a fluorescent material 1a which emits, for instance, white light. The electrodes 2a and 2b are formed by, for example, attaching aluminum tapes substantially over entire longitudinal regions of the outer peripheral surface of a gas-filled tube 1, as shown in FIG. 3. When the lamp 3 is made to emit light, a high voltage of, for instance, 3 kV or thereabouts, is applied across these electrodes 2a and 2b.

The cladding tube 4 is made of a synthetic resin having an electrically insulating property, and is formed into a hollow cylindrical shape. A silicone oil serving as an electrically insulating fluid is filled in a space S between the cladding tube 4 and the gas-filled tube 1. It should be noted that the silicone oil may be applied only to the overall surface of the lamp 3.

The lamp unit 6 emits light, i.e., white light in this embodiment, to the outside over an entire longitudinal region within an illuminating range H of a predetermined angle. The lamp unit 6 is disposed in the carriage 9 in such a manner that its illuminating range (i.e., a light-emitting portion) H opposes the original 7 in FIG. 1.

The heat-accumulating means 20 is constituted by silicone rubber 17 provided in contact with the outer peripheral surface of the cladding tube 4 as well as a metallic member 18 provided in contact with an outer peripheral surface of the silicone rubber 17, and is provided in a portion of the outer peripheral surface of the cladding tube 4 which is outside the range of the angle of the light-emitting portion H. The cross-sectional shape of the silicone rubber 17, which also serves as a heat-accumulating member, is semicircular, and its length is set to be substantially the same as the length of the cladding tube 4 of the lamp unit 6, as shown in FIG. 2. The metallic member 18 is formed from a heat-accumulating steel plate 18, and is fitted over the outer peripheral surface of the silicone rubber 17. The cross-sectional shape of this heat-accumulating steel plate 18 is also semicircular, and its length is set to be substantially the same as that of the silicone rubber 17, as shown in FIG. 2. The heat-accumulating steel plate 18 is a steel plate having iron as its principal component, such as a galvanized steel plate, has a large heat capacity, and excels in a property for storing heat, i.e., a heat accumulating capacity. The silicone rubber 17 is a very pliable material, and has a property in which its surface is active and bites into various materials. Accordingly, even if a special adhesive is not used, the silicone rubber 17 uniformly abuts against both the outer peripheral surface of the cladding tube 4 and the inner peripheral surface of the heat-accumulating steel plate 18 in a state of close contact. In other words, the heat-accumulating steel plate 18 is in close contact with the outer peripheral surface of the cladding tube 4 via the silicone rubber 17.

Figure 5:
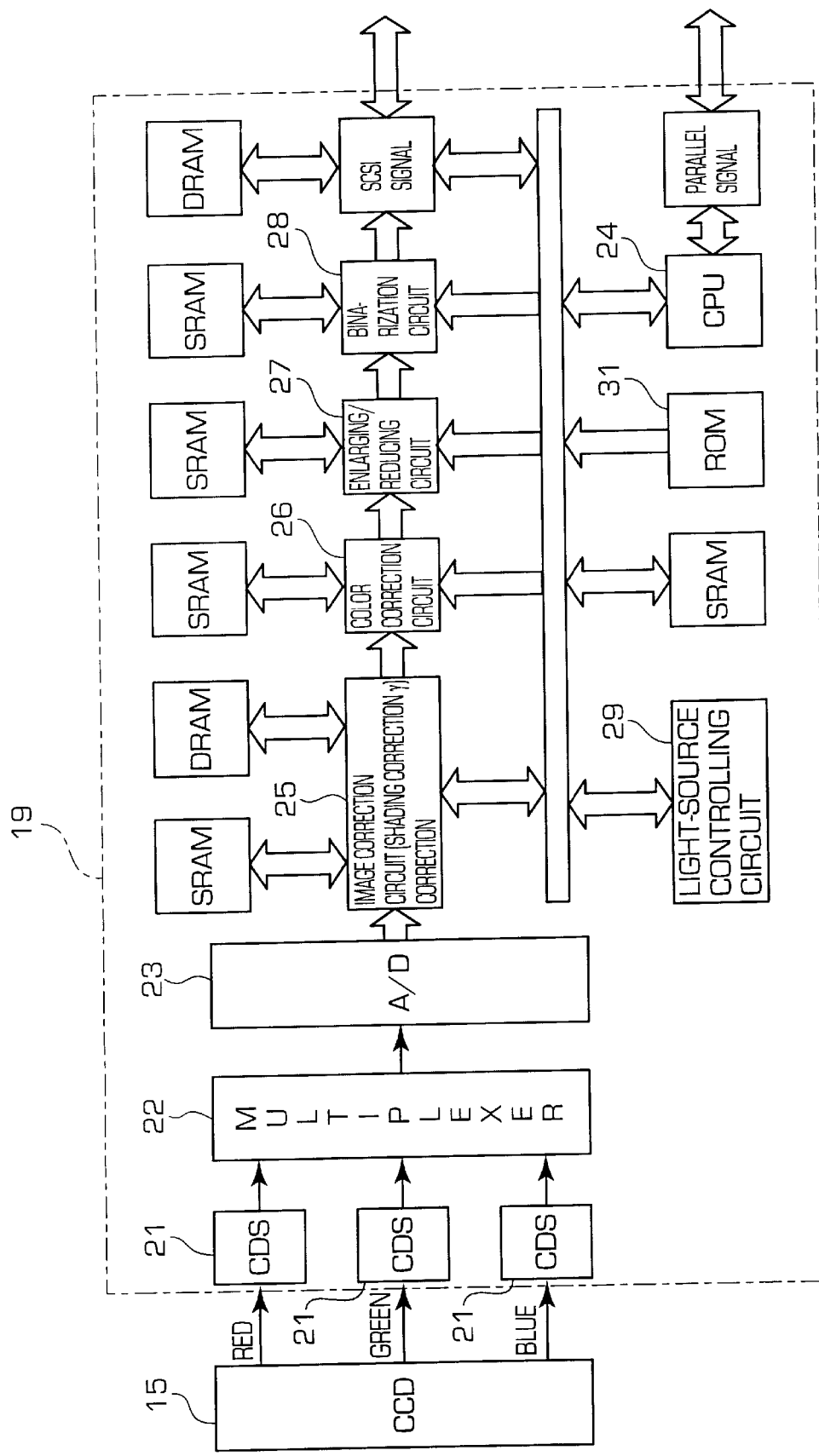
FIG. 5 is a block diagram illustrating a specific example of an image processing circuit of the image reading apparatus shown in FIG. 1.

In FIG. 1, output signals of the CCD image sensor 15 are fed to an image processing circuit 19. As shown in FIG. 5, this image processing circuit 19 is comprised of a correlated double sampling (CDS) circuit 21 for reducing noise components which are included in the output signals for the respective colors of R, G, and B; a multiplexer 22 for selecting and outputting one of the signals of the respective colors of R, G, and B; and an A/D converter 23 for converting an analog signal outputted from the multiplexer 22 into a digital signal. In addition, the image processing circuit 19 is provided with a central processing unit (CPU) 24, and connected to a system bus extending from the CPU 24 are various circuits including an image correction circuit 25, a color correction circuit 26, an enlarging/reducing circuit 27; a binarization circuit 28; and a light-source controlling circuit 29. A dynamic random access memory (DRAM) and a static random access memory (SRAM) which are attached to each circuit are used as temporary memories, work files, or the like when predetermined processing is effected in each of the circuits. A read only memory (ROM) 31 stores, among others, a program which provides for processing procedures of the image reading apparatus.

The image correction circuit 25 effects shading correction processing and gamma correction processing. The shading correction is correction for uniformalizing the distribution of the quantity of light in the longitudinal direction of the lamp, as is well known. Specifically, an initial light-quantity distribution in the longitudinal direction which is peculiar to the lamp is stored in advance, and an image signal outputted from the A/D converter 23 is corrected in correspondence with each position in the longitudinal direction. Further, in this image correction circuit 25, by sampling a CCD output when dark with the lamp turned off, it becomes possible to eliminate the nonuniformity of the CCD output when dark. The gamma correction is correction which is effected to correct the gamma characteristic peculiar to an image reading apparatus or the like, i.e., the characteristic that an output gradation value becomes nonlinear with respect to an input gradation value, as is also well known. Specifically, correction is made by, for example, multiplying the gradation value of an image signal outputted from the A/d converter 23 by an appropriate coefficient for each gradation value.

The color correction circuit 26 corrects data on the respective colors of R, G, and B appropriately such that the data on the respective colors of R, G, and B outputted from the image reading apparatus will match the output characteristic of a device which is connected in a following stage. The enlarging/reducing circuit 27 enlarges or reduces the size of the image which has been read from the original 7 in accordance with the operator's desire. The binarization circuit 28 converts the image data of, for example, 256 gradation values outputted from the A/D converter 23 into image data of two gradation values of on and off in such a manner as to match the output characteristic of the device in the following stage. The image data of two gradation values prepared as described above is transformed into a command system for a SCSI interface, and is then fed to an image output unit of a host computer or a printer in the following stage. In addition, various signals which are fed to the host computer or the printer other than the image data are transformed into the command system for a bidirectional parallel interface, and are then sent to an operation control unit of the host computer or the printer in the following stage.

The light-source controlling circuit 29 effects various control concerning the light source, i.e., the lamp 3. For example, the light-source con-trolling circuit 29 turns on and off the supply of power to the electrodes 2a and 2b of the lamp 3, and controls the intensity of light from the lamp 3 such that the light intensity becomes uniform with respect to the vertical scanning direction (i.e., the moving direction of the carriage 9 shown by arrow C in FIG. 1). The control of the light intensity concerning the vertical scanning direction can be executed by, for example, sampling the light intensity at each position when the lamp 3 moves in the vertical scanning direction by means of a photosensor (or a photosensor 66 which will be described later) provided at an appropriate position at the original table glass 8, and by adjusting the rate of amplification of an amplification circuit for the CCD image sensor 15 on the basis of the result of that sampling, or by controlling the supply of power to the lamp 3.

Since the image reading apparatus in this embodiment is configured as described above, when the read processing with respect to the original 7 is started in FIG. 1, a voltage is applied across the electrodes 2a and 2b of the lamp unit 6 in FIGS. 3 and 4, and electrons are emitted from the respective electrodes on the basis of the field emission. In this embodiment, an ac voltage is applied across the electrodes 2a and 2b, so that the electrodes alternately act as cathodes and emit electrons. However, by using a dc power source, it is also possible to use either one of them constantly as a cathode. Since the principle of generation of light in the lamp 3 is conventionally well known, a detailed description will be omitted. In brief, however, when electrons flow through the vapor of the xenon gas Xe, discharge takes place, and electromagnetic radiation occurring due to this discharge strikes the fluorescent material la and causes the overall tube to glow with white light. This light is fetched from the light-emitting portion H to outside the lamp 3 (i.e., outside the lamp unit 6), and the original 7 is illuminated with the fetched white light in FIG. 1. During this illumination, the reflected light from the original 7, i.e., the light image of the original 7, is reflected by the mirrors 13 and 14, and is focused onto the CCD image sensor 15 by the lens 16. The CCD image sensor 15 reads the received light image in a time series by the self-scanning by the CCD. This is the reading in the horizontal scanning direction along the widthwise direction of the original 7. As the carriage 9 moves in the direction of arrow C, the light emitted from the lamp unit 6 moves in the longitudinal direction of the original 7, and causes the light image of the original 7 at each position to be formed on the CCD image sensor 15. As a result, the original 7 is read in the vertical scanning direction.

The overall surface of the original 7 is read by the CCD image sensor 15 by the above-described reading in the horizontal scanning direction and the vertical scanning direction. The read processing of one original 7 is normally completed in three minutes or thereabouts. The image data which has been read is subjected to various processing including the shading correction processing, gamma correction processing, color correction processing, enlarging/reducing processing, and binarization processing by the image processing circuit 19 shown in FIG. 5, and is then fed to the host computer or the like.

In accordance with this embodiment, the following operation and effects are obtained.

(i) Since the arrangement provided is such that the cladding tube 4 having an electrically insulating property is provided in such a manner as to surround the lamp 3, and the heat-accumulating means 20 is provided in contact with the outer peripheral surface of this cladding tube 4, it is possible to provide an appropriate and suitable heat-accumulating means without shortcircuiting the electrodes 2a and 2b. Therefore, in accordance with this lamp unit 6, it is possible to favorably reduce both the rate of change δ1 in the quantity of light and the difference δ2 in the rate of change in the quantity of light. Since both the rate of change δ1 in the quantity of light and the difference δ2 in the rate of change in the quantity of light are made small, it is possible to read the entire region from the beginning to the end of the reading of the original 7 with a uniform quantity of light, so that the density of the image which is reproduced after reading becomes uniform, thereby making it possible to reproduce an image faithful to the image of the original 7.

(ii) Since the silicone-rubber 17, which is a rubber member, is interposed between the lamp 3 and the metallic member 18, it is possible to prevent discharge between each electrode 2a, 2b and the metallic member 18. Since a high voltage is applied across the electrodes 2a and 2b in the case of the lamp 3 of the outer-surface electrode type, if the heat-accumulating means is provided without devising any countermeasure, there is a high risk of causing discharge between each electrode and the heat-accumulating metallic member. In contrast, in this embodiment, since the discharge is prevented as described above, it is possible to provide the heat-accumulating means over a wide range.

(iii) Since the heat-accumulating means 20 is comprised of the silicone rubber 17 provided in contact with the outer peripheral surface of the cladding tube 4 as well as the heat-accumulating metallic member 18 provided in contact with the outer peripheral surface of the silicone rubber, the heat of the lamp 3 is transmitted to the heat-accumulating metallic member 18 favorably (efficiently) through the silicone rubber 17 via the cladding tube 4, and is accumulated therein. Moreover, since the space S between the lamp 3 and the cladding tube 4 as well as the silicone rubber 17 itself also have heat-accumulating properties to some extent, the heat of the lamp 3 is accumulated in the space S and the silicone rubber 17 as well. Accordingly, it is possible to reduce the rate of increase in the temperature of the lamp 3 after being lit more effectively, and it is possible to reduce the rate of change δ1 in the quantity of light and the difference δ2 in the rate of change in the quantity of light very satisfactorily.

Figure 12:
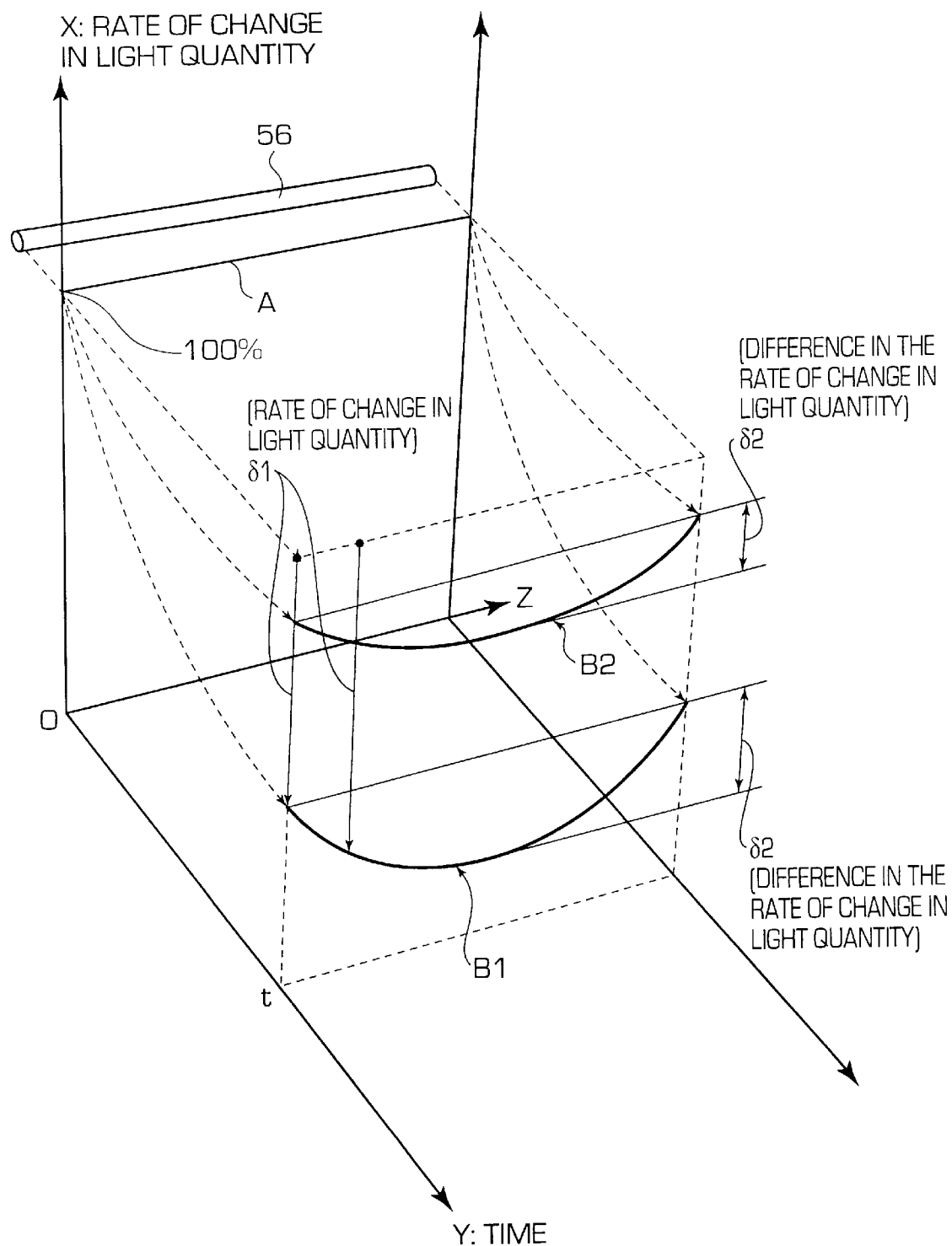
FIG. 12 is a graph which three-dimensionally shows the manner of change over time of the rate of change in the quantity of light from a light source and the difference in the rate of change in the quantity of light.
Figure 13:
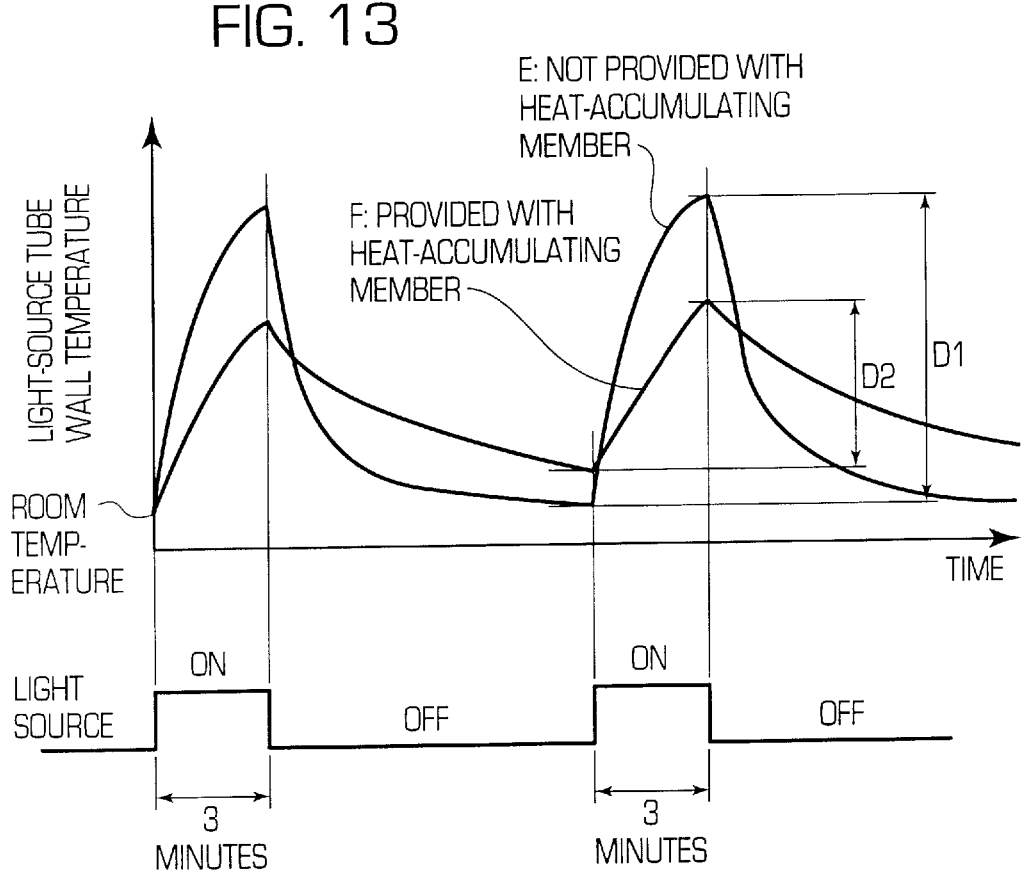
FIG. 13 is a graph which shows the manner of change over time in the temperature of the respective tube walls of a lamp provided with a heat-accumulating member and a lamp not provided with the heat-accumulating member.
Figure 14:
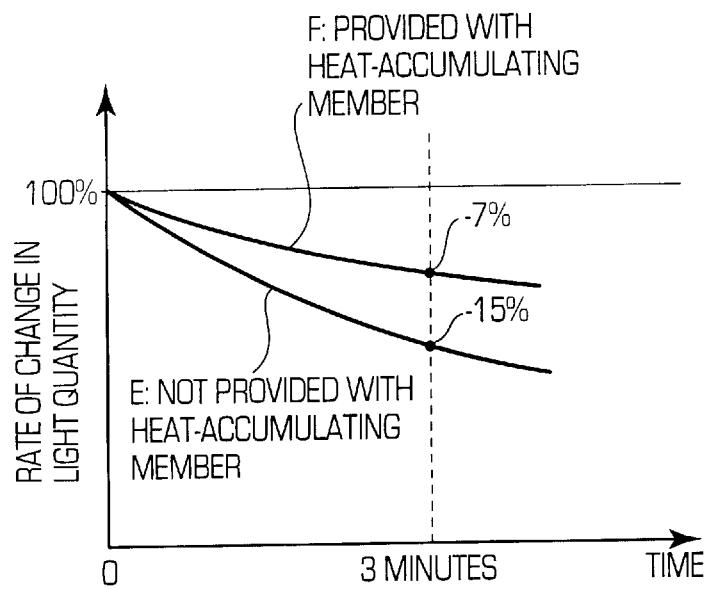
FIG. 14 is a graph which shows the manner of change overtime in the respective rates of change in the quantity of light of the lamp provided with the heat-accumulating member and the lamp not provided with the heat-accumulating member.

This will be described with reference to FIGS. 12, 13, and 14. FIG. 12 is a graph which three-dimensionally shows the manner of change over time of the rate of change in the quantity of light from the light source and the difference in the rate of change in the quantity of light. In the graph shown in the drawing, the rate of change in the quantity of light is taken as the X-axis, the time is taken as the Y-axis, and the axial direction, i.e., the horizontal scanning direction, of the lamp (56) is taken as the Z-axis, as described before. FIG. 13 is a graph which shows the manner of change in the temperature of the tube wall of each lamp in a case where a lamp of the outer-surface electrode type was prepared which was provided with the heat-accumulating means (or the heat-accumulating member) and the same lamp was prepared which was not provided with the heat-accumulating means (or the heat-accumulating member), and these lamps were repeatedly turned on for three minutes and turned off for a predetermined time. The reason that the lighting time was set to three minutes is because in a case where one original is read by the image reading apparatus, the lighting time of three minutes or thereabouts is generally required, as described above. FIG. 14 is a graph which shows the rate of change in the quantity of light (curve F) three minutes after the lighting up of the lamp in a case where the lamp of the-outer-surface electrode type was provided with the heat-accumulating means (or the heat-accumulating member) as well as the rate of change in the quantity of light (curve E) three minutes after the lighting up of the lamp in a case where the same lamp was not provided with the heat-accumulating means (or the heat-accumulating member). Incidentally, these graphs were obtained from experiments conducted by the inventor of the present application.

In the lamp unit 6 of this embodiment, since the silicone rubber 17 and the heat-accumulating steel plate 18 are fitted around the cladding tube 4 so as to be brought into surface contact therewith, the heat which is generated in the gas-filled tube 1 is efficiently transmitted to the silicone rubber 17 and the heat-accumulating steel plate 18, and is accumulated therein. Consequently, as shown in FIG. 13, as compared with the case of a conventional lamp (E) which is not provided with the heat-accumulating steel plate 18 and the like, the maximum temperature of the tube wall temperature of the gas-filled tube 1 in a time duration required for reading, e.g., three minutes, becomes lower, and its minimum temperature becomes higher (the amount of change D2 in the tube wall temperature after the lamp provided with the heat-accumulating member (curve F) is lit for three minutes becomes substantially smaller than the amount of change D1 in the tube wall temperature after the lamp not provided with the heat-accumulating member (curve E) is lit for three minutes).

That is, the amount of change in the tube wall temperature of the gas-filled tube 1 (i.e., the lamp 3) becomes small by the provision of the heat-accumulating steel plate 18 and the like. As a result, as shown in FIG. 14, the rate of change in the quantity of light in the time duration (about three minutes) required for reading can be reduced to ½ or thereabouts. As is apparent from FIG. 12, the fact that the rate of change δ1 in the quantity of light is reduced naturally means that the difference δ2 in the rate of change in the quantity of light is also reduced. Hence, the distribution of the quantity of light in the longitudinal direction of the lamp unit 6 changes from B1 to B2 as shown in FIG. 12 in such a way that both the rate of change δ1 in the quantity of light and the difference δ2 in the rate of change in the quantity of light are reduced. If both the rate of change δ1 in the quantity of light and the difference δ2 in the rate of change in the quantity of light become small, it is possible to read the entire region from the beginning to the end of the reading of the original 7 with a uniform quantity of light, so that the density of the image which is reproduced after reading becomes uniform, thereby making it possible to reproduce an image faithful to the image of the original 7.

To sum up the foregoing, in this embodiment, as a result of the use of the heat-accumulating means 20 constituted by the silicone rubber 17 and the heat-accumulating steel plate 18, it becomes possible to (1) reduce the rate of change δ1 in the quantity of light, and (2) make small the difference in the rate of change δ1 in the quantity of light in the longitudinal direction of the lamp.

Here, as described before, one cause of the variation in the quantity of light lies in the increase in the temperature of the lamp tube wall, so that it is effective to turn off the lamp after the reading of the original. If the lamp is thus turned off, it is possible to obtain the following advantages:

(a) it is possible to suppress the increase in the temperature of the lamp tube wall;

(b) it is possible to avoid the saturation of heat in the heat-accumulating means (or the heat-accumulating member);

(c) it is possible to lower the power consumption; and (d) when a sampling operation of the "output when dark" in the above-described shading correction is effected, the lamp turning-off operation and the ensuing operation of correction of the change in the quantity of light become unnecessary.

Modification of the Lamp Unit

Second Embodiment

Figure 6:
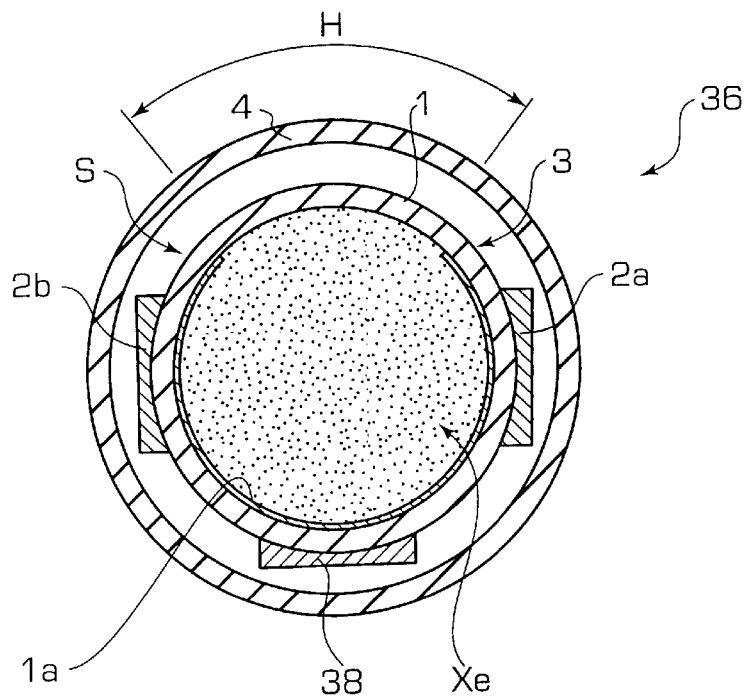
FIG. 6 is a cross-sectional view illustrating a second embodiment of the lamp unit in accordance with the present invention.

FIG. 6 is a cross-sectional view illustrating a second embodiment of the lamp unit in accordance with the present invention. In the drawing, the same members as those shown in FIGS. 3 and 4 are denoted by the same reference numerals. This lamp unit 36 uses a heat-accumulating steel plate 38 as the heat-accumulating means, and this heat-accumulating steel plate 38 is not provided on the outer peripheral surface of the cladding tube 4, but is bonded to the outer peripheral surface of the gas-filled tube 1 at a position where the heat-accumulating steel plate 38 does not come into contact with the pair of electrodes 2a and 2b. The heat-accumulating steel plate 38 may be directly bonded to the gas-filled tube 1, or may be bonded thereto via the silicone rubber. In the first embodiment shown in FIG. 4, the gas-filled tube 1 is covered with the cladding tube 4 to form a light-emitting tube, and the silicone rubber 17 and the heat-accumulating steel plate 18, which serve as the heat-accumulating means, are subsequently fitted over the outer peripheral surface of the light-emitting tube. In contrast, in this embodiment shown in FIG. 6, the lamp unit with the heat-accumulating steel plate 38 incorporated therein is completed at a point of time when the gas-filled tube 1 is covered with the cladding tube 4.

Third Embodiment

Figure 7:
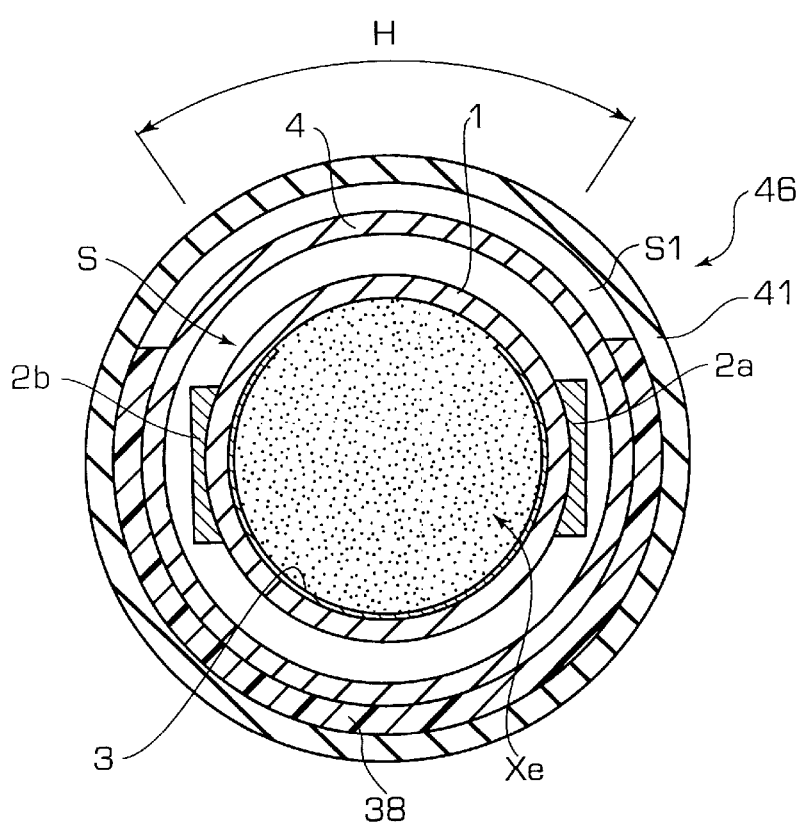
FIG. 7 is a cross-sectional view illustrating a third embodiment of the lamp unit in accordance with the present invention.

FIG. 7 is a cross-sectional view illustrating a third embodiment of the lamp unit in accordance with the present invention. In the drawing, the same members as those shown in FIGS. 3 and 4 are denoted by the same reference numerals. This lamp unit 46 uses the heat-accumulating steel plate 38 as the heat-accumulating means, and this heat-accumulating steel plate 38 is secured to the outer peripheral surface of the cladding tube 4. Then, the periphery of the secured heat-accumulating steel plate 38 is further surrounded by a sheathing tube 41 so as to hold the heat-accumulating steel plate 38 reliably. The sheathing tube 41 is formed of a transparent synthetic resin or glass. According to such a lamp unit 46, a space SI between the cladding tube 4 and the sheathing tube 41 as well as the sheathing tube 41 itself also serve as the heat-accumulating means. It should be noted that, instead of the heat-accumulating steel plate 38, silicone rubber or a laminated member formed by the heat-accumulating steel plate and the silicone rubber may be used.

Fourth Embodiment

Figure 10:
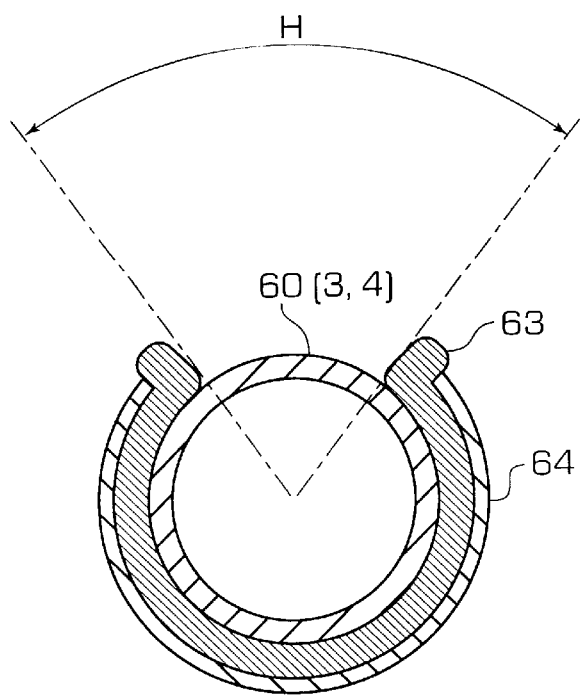
FIG. 10 is a cross-sectional view thereof.
Figure 11:
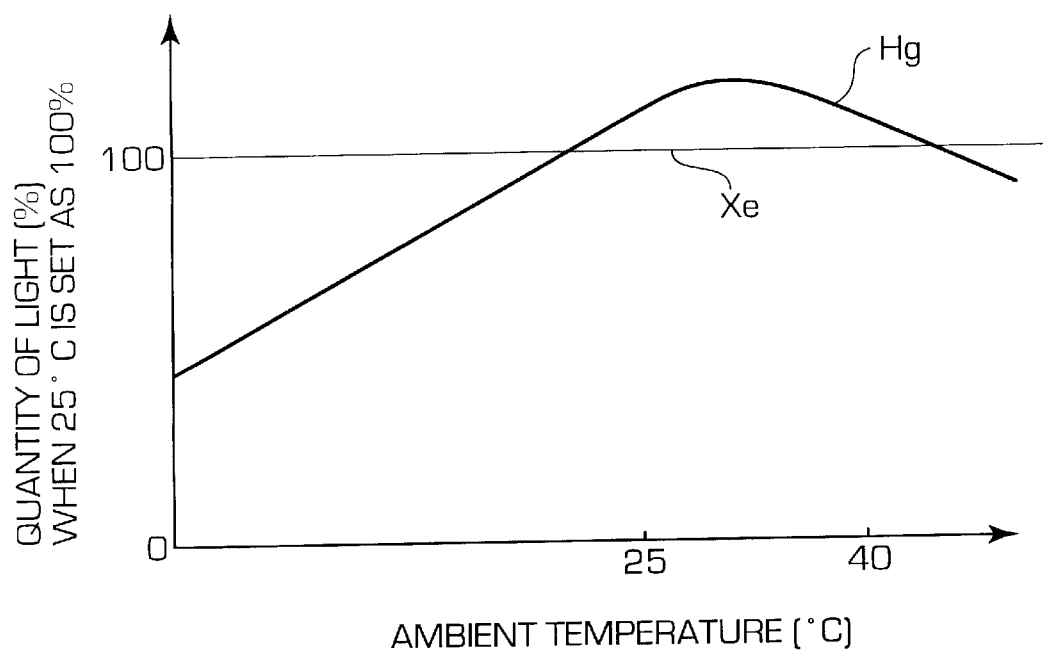
FIG. 11 is a graph illustrating quantity-of-light-emission characteristics of a lamp using mercury (Hg) gas and a lamp using xenon (Xe) gas.

FIG. 8 is a diagram which simultaneously show a perspective view illustrating a fourth embodiment of the lamp unit in accordance with the present invention and a partially enlarged view thereof; FIG. 9 is an exploded perspective view; and FIG. 10 is a cross-sectional view. In these drawings (mainly FIG. 9), reference numeral 60 denotes a light-emitting member, and the lamp 3 or a lamp in which the lamp 3 is surrounded by the cladding tube 4 may be used. Reference numerals 61 and 62 denote holders, which hold opposite ends of the light-emitting member 60 (i.e., the lamp 3 or the like).

Reference numeral 63 denotes a heat-accumulating sheet made of silicone rubber and serving as a heat-accumulating member, and this heat-accumulating sheet 63 is provided in contact with the outer peripheral surface of the light-emitting member 60. This heat-accumulating sheet 63 is formed in advance into a C-shaped cross-sectional configuration so as to improve the attachability and the characteristic of close contact with respect to the light-emitting member 60. Reference numeral 64 denotes a heat-accumulating metal plate having a C-shaped cross section and serving as a heat-accumulating member, and this heat-accumulating metal plate 64 is provided in contact with the outer peripheral surface of the heat-accumulating sheet 63. The heat-accumulating metal plate 64 may be formed from the same material as that of the aforementioned heat-accumulating steel plate 18. The heat-accumulating sheet 63 and the heat-accumulating metal plate 64 have substantially the same length as that of the light-emitting member 60 and, to be more precise, has a length which is slightly shorter (shorter by 1 to 3 mm or thereabouts) than an exposed portion of the light-emitting member 60 which is held by the holders 61 and 62. Additionally, light-quantity measuring holes 63c and 64c are provided in the heat-accumulating sheet 63 and the heat-accumulating metal plate 64.

Reference numerals 65, 65 denote fastening belts made of a synthetic resin, and the heat-accumulating sheet 63 and the heat-accumulating metal plate 64 are attached to the light-emitting member 60 by means of these fastening belts 65, 65. Notched portions 64a, 64a are partially formed in the heat-accumulating metal plate 64 at positions where the fastening belts 65 are wound.

A positioning portion 62b formed in the shape of a projection for determining the position where the heat-accumulating sheet 63 and the heat-accumulating metal plate 64 are attached is provided integrally on an inner side surface of one holder 62 of the pair of holders. Meanwhile, positioning recessed portions 63b and 64b which fit to the aforementioned positioning portion 62b are formed in one side ends of the heat-accumulating sheet 63 and the heat-accumulating metal plate 64. In addition, the pair of holders 61 and 62 are provided with pins 61a and 62a for positioning when this lamp unit is mounted inside the light-shielding plate 12 in the image reading apparatus shown in FIG. 1.

Such a lamp unit can be easily assembled simply by applying the heat-accumulating sheet 63 and the heat-accumulating metal plate 64 to the light-emitting member 60 such that their recessed portions 63b and 64b fit to the positioning portion 62b of the holder 62, and by fastening the fastening belts 65, 65. At this time, since the heat-accumulating sheet 63 and the heat-accumulating metal plate 64 are formed into C-shaped cross-sectional configurations, the heat-accumulating sheet 63 and the heat-accumulating metal plate 64 can be easily-applied to the light-emitting member 60, and the fastening operation of the fastening belts 65 is also facilitated. In the assembled state, the illuminating range H of the light-emitting member 60 is determined by side edge portions 63d, 63d of the heat-accumulating sheet 63, as shown in FIG. 10.

In accordance with such a lamp unit, the following operation and effects are obtained.

(a) Since the notched portions 64a are partially formed in the heat-accumulating metal plate 64 at positions where the fastening belts 65 are wound, the heat-accumulating sheet 63 can be fixed more reliably in close contact with the light-emitting member 60, and the offset of the fastening belts 65 after assembly can be prevented.

(b) Since the heat-accumulating sheet 63 and the heat-accumulating metal plate 64 are provided substantially over the entire longitudinal region of the light-emitting member 60, it is possible to obtain an excellent heat-accumulating effect over the entire longitudinal region of the light-emitting member 60.

(c) Since the arrangement provided is such that the illuminating range H is determined by the heat-accumulating sheet 63, in a case where the lamp. (the lamp which directly constitutes the light-emitting member 60 or the lamp which is fitted inside the cladding tube 4) which constitutes the light-emitting member 60 is a fluorescent lamp, the range of application of its fluorescent material need not necessarily be controlled strictly, thereby making it possible to reduce the cost. Namely, it suffices if the fluorescent material is applied (in a narrow range of application) in such a way that an illuminating range which is slightly wider than the illuminating range H to be essentially obtained can be obtained. In addition, in a case where the lamp is not a fluorescent lamp, since the illuminating range H can be determined without application of the fluorescent material, a further reduction of the cost can be attained. Incidentally, this effect can also be obtained by an arrangement in which the illuminating range is determined by the heat-accumulating metal plate 64.

(d) Since the light-quantity measuring holes 63c and 64c are provided in the heat-accumulating sheet 63 and the heat-accumulating metal plate 64, the photosensor 66 (see FIG. 1) can be disposed in proximity to the lamp at a position opposing these holes. Hence, it is possible to effect measurement of the quantity of light with high accuracy.

(e) Since the positioning portion 62b for determining the position where the heat-accumulating sheet 63 and the heat-accumulating metal plate 64 are attached is provided on the holder 62, the heat-accumulating sheet 63 and the heat-accumulating metal plate 64 can be easily attached at an appropriate position, and at the same time the illuminating range H and the position of the holes 63c and 64c can be easily determined.

(f) Since the holders 61 and 62 are provided with the pins 61a and 62a for determining the mounting position of the lamp unit with respect to the image reading apparatus, the lamp unit can be accurately and easily mounted in the image reading apparatus.

Other Embodiments

Although the preferred embodiments have been described above, the present invention is not limited to the embodiments, and can be modified in various ways within the technical range stated in the claims.

Figure 16:
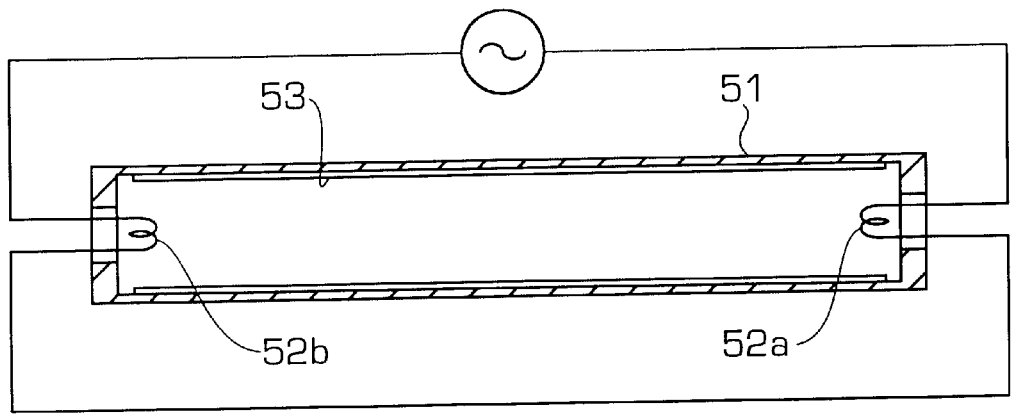
FIG. 16 is a front cross-sectional view illustrating a hot-cathode tube of a both-end electrode type.
Figure 17:
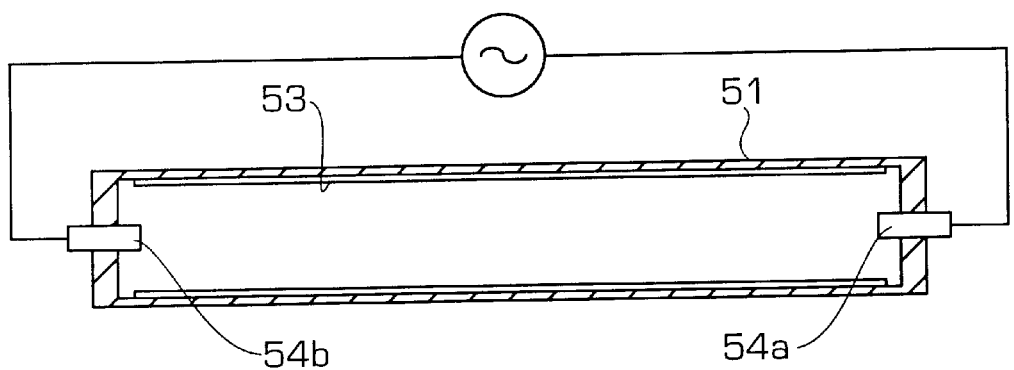
FIG. 17 is a front cross-sectional view illustrating a cold-cathode tube of the both-end electrode type.
Figure 18:
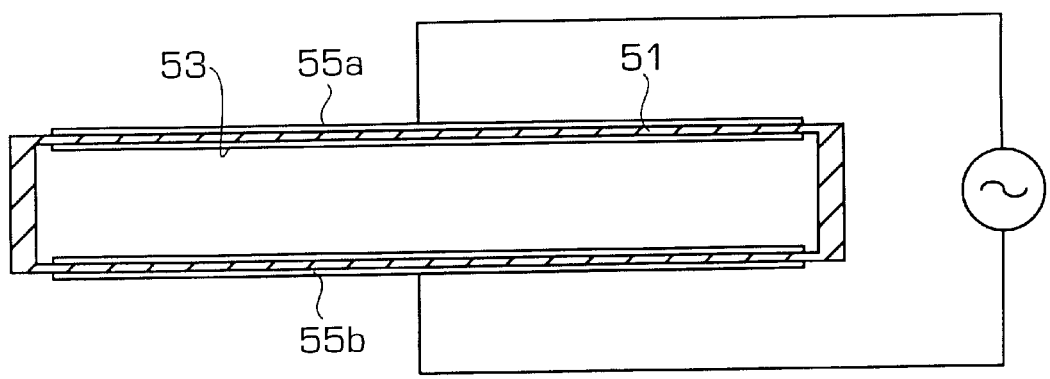
FIG. 18 is a front cross-sectional view illustrating a cold-cathode tube of an outer-surface electrode type.
Figure 19:
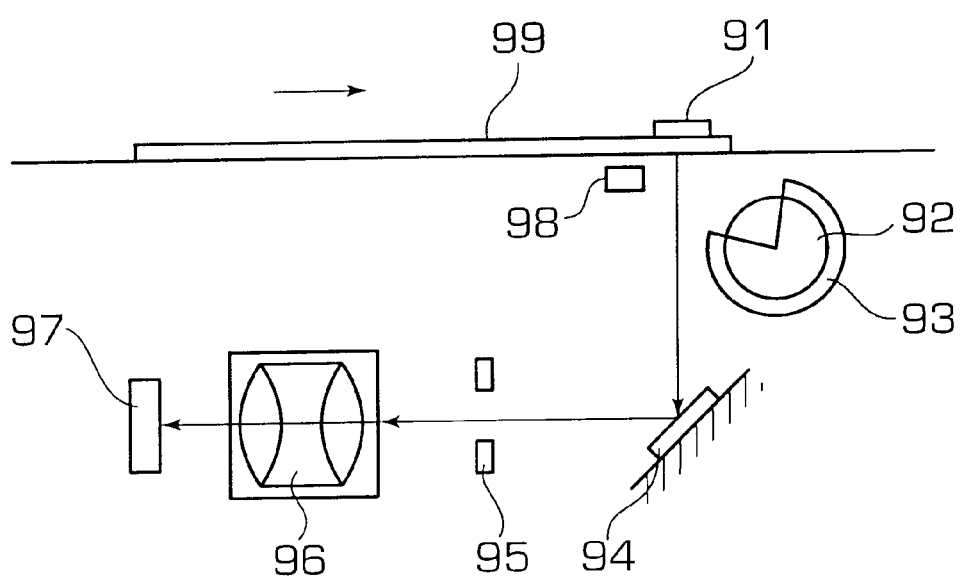
FIG. 19 is an explanatory diagram of the conventional art.
Figure 20:
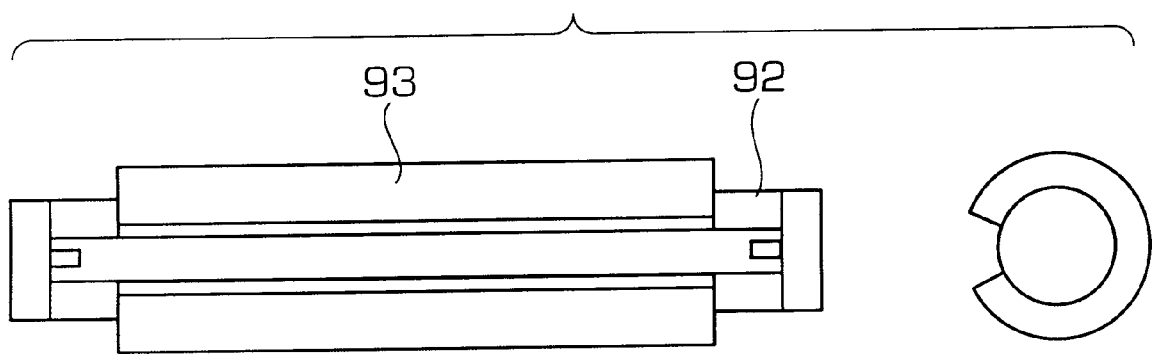
FIG. 20 is another explanatory diagram of the conventional art.

For example, (1) In the foregoing description, a case has been illustrated in which the cathode tube of the outer-surface electrode type (FIG. 18) is provided with the heat-accumulating means (or the heat-accumulating member; hereafter the same). As already mentioned, as compared with the hot-cathode tube of the both-end electrode type (FIG. 16) and the cold-cathode tube of the both-end electrode type (FIG. 17), the cathode tube of the outer-surface electrode type (FIG. 18) has a very large amount of emission of light, but undergoes a large change over time in the quantity of light. Therefore, if this cathode tube of the outer-surface electrode type (FIG. 18) is provided with the heat-accumulating means, it is possible to most noticeably obtain the advantages that the rate of change $\delta$ in the quantity of light and the difference $\delta 2$ in the rate of change in the quantity of light can be made small, and that the amount of exposure of the original when the original is read can be made uniform. However, the hot-cathode tube of the both-end electrode type (FIG. 16) and the cold-cathode tube of the both-end electrode type (FIG. 17) can also be provided with the heat-accumulating means.

(2) In the embodiment shown in FIG. 1, the light reflected by the original 7 is read by the CCD image sensor 15. Alternatively, however, the light transmitted through the original 7 may be read by the CCD image sensor 15.

(3) In the above-described embodiments, the case in which white light is emitted by the lamp unit 6 has been illustrated. However, the color of the emitted light is not limited to any particular color.

(4) Although the heat-accumulating means shown in FIGS. 3 and 4 is constituted by the silicone rubber 17 and the heat-accumulating metal steel plate 18, the heat-accumulating means may be constituted by only the silicone rubber 17 or the heat-accumulating metal steel plate 18.

(5) Although, in the lamp unit shown in FIGS. 3 and 4, the heat-accumulating means 20 is provided on the outer peripheral surface of the cladding tube 4, the heat-accumulating means 20 may be provided on the outer peripheral surface of the lamp 3 without providing the cladding tube 4. The reason for this is that the silicone rubber has an electrically insulating property.

(6) The heat-accumulating means may be provided partially in the longitudinal direction of the lamp.

(7) The heat-accumulating means may be constituted by a substance having a large heat capacity, such as a steel plate having iron as its principal component, other general metallic materials, nonmetallic materials such as rubber, resinous members, or the like, in addition to those described above.

(8) As for the silicone rubber serving as the heat-accumulating means, an appropriate rubber member may be used instead. Even if such an arrangement is adopted, it is possible to (a) allow the heat-accumulating action to be exhibited by the rubber member itself, (b) ensure electrical insulation between each electrode and the metallic member serving as the heat-accumulating means and between the electrodes, and (c) enhance the close contact between the lamp and the metallic member.

(9) Although the heat-accumulating sheet 63 shown in FIG. 9 is formed in advance into a C-shaped cross-sectional configuration, since the silicone rubber sheet has sufficient pliability, the heat-accumulating sheet 63 may not necessarily be formed in advance into the C-shaped cross-sectional configuration.

(10) Although the lamp unit shown in FIG. 9 is provided with the pair of holders 61 and 62, an arrangement may be provided such that the lamp unit is provided with only one holder 62.

(11) The gas which is filled in the lamp is not restricted to a particular gas. However, in a case where the gas is used for the lamp of an image reading apparatus, it is preferable to use a rare gas having a property in which the change in the quantity of light is small even if the ambient temperature changes, such as xenon gas or neon gas.

EXAMPLE

Figure 15:
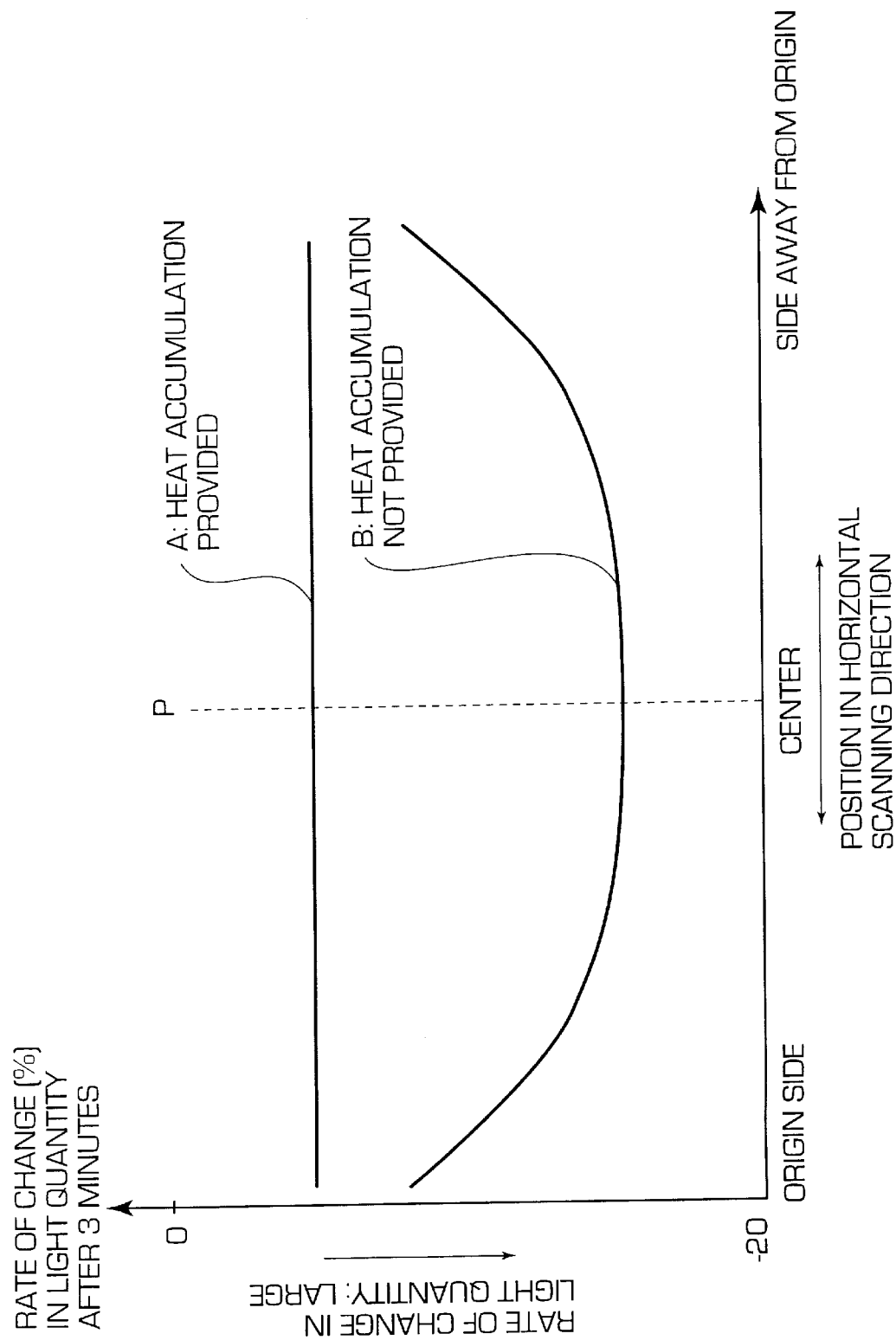
FIG. 15 is a graph illustrating the results of an experiment concerning the lamp unit in accordance with the present invention.

Hereafter, a description will be given of a example of an experiment which was conducted by the present inventor.
1. Conditions of the Experiment The lamp 3 of the outer-surface electrode type shown in FIGS. 3 and 4 was prepared. The silicone rubber 17 and the heat-accumulating steel plate 18 were fitted to the lamp to form the lamp unit, as shown in FIGS. 3 and 4, and this was set as a sample A. In this experiment, however, alumina was mixed in the silicone rubber 17. The lamp unit of this sample A was lit up, and measurement was made of the rate of change in the quantity of light at each position in the longitudinal direction of the lamp unit (i.e., in the horizontal scanning direction) three minutes after lighting-up. Subsequently, the silicone rubber 17 and the heat-accumulating steel plate 18 were removed from the lamp unit of the sample A to obtain only the lamp, and this was set as a sample B. The lamp of this sample B was lit up, and the rate of change in the quantity of light at the same positions as the above three minutes after the lighting-up were measured. By taking into consideration the variations in the manufacture of the lamp itself, another lamp was prepared, and the same experiment as the above was conducted. The two samples A and the two samples B were averaged, and were set as the results of the experiment.
2. Results of the Experiment As a result of the above-described measurement, results such as those shown in the graph in FIG. 15 were obtained. In this graph, the abscissa shows the position in the longitudinal direction of the lamp unit (i.e., the horizontal scanning direction). The broken line P shows a central portion in the longitudinal direction of the lamp unit. The ordinate of the graph shows the rate of change in the quantity of light three minutes after lighting-up, and shows that the rate of change in the quantity of light is greater from the upper toward the lower position. In this graph, the curve B (heat accumulation not provided) shows the rate of change in the quantity of light from the lamp (sample B) to which the heat-accumulating means, i.e., the silicone rubber and the heat-accumulating steel plate, is not fitted. The line A (heat accumulation provided) shows the rate of change in the quantity of light from the lamp unit (sample A) in which the heat-accumulating means is fitted to the same lamp. As is apparent from FIG. 15, it can be appreciated that the rate of change in the quantity of light is about half or thereabouts in the case where the heat-accumulating means is provided as compared to the case where it is not. In addition, it can also be appreciated that the difference in the rate of change in the quantity of light is substantially zero. That is, in terms of the rate of change in the quantity of light in the horizontal scanning direction, it can be appreciated that the rate of change in the quantity of light in the longitudinal direction (i.e., the horizontal scanning direction) is substantially uniform in the case of the sample A in which the heat-accumulating means is employed. A comparison between these results and the results of the experiment shown in FIG. 12 shows that the mixture of alumina in the silicone rubber is very effective.

This feature is a characteristic which is very desirable when the change in the quantity of light from the lamp is electrically corrected. If a description is given in greater detail, in a case where shading correction is effected also in the vertical scanning direction by monitoring a white reference provided in the vertical scanning direction so as to electrically correct the change in the quantity of light from the lamp in the vertical scanning direction by this shading correction, by the use of the above-described "heat-accumulating means," if the two points of (1) reducing the rate of change in the quantity of light of the lamp, and (2) uniformalizing the rate of change in the quantity of light in the longitudinal direction of the lamp are realized in advance, then the electrical correction concerning the aforementioned vertical scanning direction, which is carried out later, can be effected very accurately.

INDUSTRIAL APPLICABILITY

Any one of the lamp units in accordance with the present invention makes it possible to substantially reduce both the rate of change in the quantity of light over time after the lighting up of the lamp and the difference in the rate of change in the quantity of light.

Accordingly, in accordance with the image reading apparatus using the lamp unit, the change in the quantity of light from the start to the end of the reading of the original is reduced substantially, thereby making it possible to faithfully reproduce the image of the original over the overall surface in its longitudinal direction.

What is claimed is:

1. A lamp unit comprising: a lamp including hollow cylindrical gas-filled tube in which a gas is filled and a pair of electrodes provided at opposite end portions of said gas-filled tube; and heat-accumulating means provided around said, wherein lamp said heat-accumulating means has silicone rubber provided around said lamp and a matallic member provided in contact with an outer peripheral surface of said silicone rubber, and wherein said silicone rubber extends substantially along an entire longitudinal length of said gas-filled tube.

2. A lamp unit comprising: a lamp including a hollow cylindrical gas-filled tube in which a gas is filled and a pair of electrodes provided at opposite end portions of said gas-filled tube; a heat-accumulating sheet made of silicone rubber and serving as a heat-accumulating member provided around said lamp; a heat-accumulating metal plate having a C-shaped cross section and serving as a heat-accumulating member, said heat-accumulating metal plate being provided in contact with an outer peripheral surface of said heat-accumulating sheet, wherein said heat-accumulating sheet and said heat-accumulating metal plate are attached to said lamp by means of fastening belts.

3. A lamp unit comprising: a lamp including a hollow cylindrical gas-filled tube in which a gas is filled and a pair of electrodes which are-provided on an outer peripheral surface of said gas-filled tube and extend in a longitudinal direction of said gas-filled tube in a mutually opposing state; an electrically insulating cladding tube surrounding said lamp; and heat-accumulating means provided in contact with an outer peripheral surface of said cladding tube that faces away from said gas-filled tube.

4. The lamp unit according to claim 3, wherein said heat-accumulating means has silicone rubber provided in contact with the outer peripheral surface of said cladding tube and a metallic member provided in contact with an outer peripheral surface of said silicone rubber.

5. The lamp unit according to claim 4, wherein said heat-accumulating means or said heat-accumulating member is provided substantially over an entire longitudinal region of said lamp, and said heat-accumulating means or said heat-accumulating member is provided with a hole for measuring a quantity of light.

6. The lamp unit according to claim 4, wherein said heat-accumulating means or said heat-accumulating member is provided in a C-shaped cross-sectional configuration substantially over an entire longitudinal region of said lamp, whereby an illuminating range of said lamp is determined.

7. An image reading apparatus comprising: a light source for emitting light for illuminating an original; and an image sensor for receiving a light image from the original and providing an output as an electrical signal, wherein said light source is constituted by the lamp unit according to claim 6.

8. The image reading apparatus according to claim 7, wherein said lamp is turned off after completion of the illumination for reading the original.

9. A lamp unit comprising: a lamp including a hollow cylindrical gas-filled tube in which a gas is filled and a pair of electrodes which are provided on an outer peripheral surface of said gas-filled tube and extend in a longitudinal direction of said gas-filled tube in a mutually opposing state; and an electrically insulating heat-accumulating member provided around said lamp, wherein said electrically insulating heat-accumulating member extends substantially along an entire longitudinal length of said gas-filled tube.

10. The lamp unit according to claim 9, further comprising: a metallic heat-accumulating member which abuts against an outer peripheral surface of said electrically insulating heat-accumulating member.

11. The lamp unit according to claim 9 or 10, wherein said electrically insulating heat-accumulating member is silicone rubber.

12. A lamp unit comprising: a lamp including a hollow cylindrical gas-filled tube in which a gas is filled and a pair of electrodes which are provided on an outer peripheral surface of said gas-filled tube and extend in a longitudinal direction of said gas-filled tube in a mutually opposing state; an electrically insulating cladding tube surrounding said lamp; a heat-accumulating sheet made of silicone rubber and serving as a heat-accumulating member provided in contact with an outer peripheral surface of said cladding tube; a heat-accumulating metal plate having a C-shaped cross section and serving as a heat-accumulating member, said heat-accumulating metal plate being provided in contact with an outer peripheral surface of said heat-accumulating sheet, wherein said heat-accumulating sheet and said heat-accumulating metal plate are attached to said cladding tube by means of fastening belts.

13. The lamp unit according to claim 2 or 12, wherein notched portions are respectively partially formed in said heat-accumulating metal plate at positions where said fastening belts are wound.

14. The lamp unit according to claim 12, further comprising: a lamp holder for holding at least one end portion of said lamp, said lamp holder being provided with a positioning portion for determining a position where said heat-accumulating means or said heat-accumulating member is attached.

15. An image reading apparatus comprising: a light source for emitting light for illuminating an original; and an image sensor for receiving a light image from the original and providing an output as an electrical signal, wherein the light source is constituted by the lamp unit according to claim 14, and said lamp holder constitutes said positioning member for determining a mounting position of the lamp unit.

16. The lamp unit according to claim 12, wherein alumina is mixed in said silicone rubber.

17. A lamp unit comprising: a lamp including a hollow cylindrical gas-filled tube in which a gas is filled and a pair of electrodes which are provided on an outer peripheral -surface of said gas-filled tube and extend in a longitudinal direction of said gas-filled tube in a mutually opposing state; heat-accumulating means provided in contact with an outer peripheral surface of said gas-filled tube at a position where said heat-accumulating means does not contact said pair of electrodes; and an electrically insulating cladding tube surrounding said lamp and said heat-accumulating means, wherein said heat-accumulating means contacts and extends substantially along an entire longitudinal length of said gas-filled tube.

18. The lamp unit according to claim 17, wherein said heat-accumulating means is a metallic member.

19. The lamp unit according to claim 17, wherein said heat-accumulating means is silicone rubber.

20. An image reading apparatus comprising: a light source for emitting light for illuminating an original; and an image sensor for receiving a light image from the original and providing an output as an electrical signal, wherein the light source is constituted by the lamp unit according to claim 5, and a photosensor is provided at a position opposing the hole for measuring the quantity of light.

* * * * *